US012761083B2

(12) United States Patent
Zimin et al.

(10) Patent No.: US 12,761,083 B2
(45) Date of Patent: Oct. 13, 2026

(54) METHOD AND DEVICE FOR PHOTONIC SAMPLING OF A TEST WAVE-FORM

(71) Applicant: Max-Planck-Gesellschaft zur Förderung der Wissenschaften e.V., Munich (DE)

(72) Inventors: Dmitry Zimin, Cambridge (GB); Ferenc Krausz, Garching (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 43 days.

(21) Appl. No.: 18/438,678

(22) Filed: Feb. 12, 2024

(65) Prior Publication Data

US 2024/0201017 A1 Jun. 20, 2024

Related U.S. Application Data

(63) Continuation of application No. PCT/EP2021/075105, filed on Sep. 13, 2021.

(30) Foreign Application Priority Data

Aug. 18, 2021 (WO) ................. PCT/EP2021/072955

(51) Int. Cl.
*G01J 11/00* (2006.01)
*G01J 9/04* (2006.01)

(52) U.S. Cl.
CPC ................. *G01J 11/00* (2013.01); *G01J 9/04* (2013.01)

(58) Field of Classification Search
CPC .................................... G01J 11/00; G01J 9/04
See application file for complete search history.

(56) References Cited

U.S. PATENT DOCUMENTS 5,847,825 A 12/1998 Alexander
6,583,911 B1 6/2003 Alexander et al.
(Continued)

FOREIGN PATENT DOCUMENTS

EP 3803325 A1 4/2021
WO 2002032019 A1 4/2002
(Continued)

OTHER PUBLICATIONS

Cook et al, "Intense terahertz pulses by four-wave rectification in air", 2000, Optics Letters, vol. 25, No. 16. (Year: 2000).*
(Continued)

*Primary Examiner* — Michelle M Iacoletti
*Assistant Examiner* — Judy Dao Tran
(74) *Attorney, Agent, or Firm* — Pearl Cohen PartGmbB; Raphael Tautz

(57) ABSTRACT

A method for photonic sampling of a test-waveform is provided. The method includes providing a sampling light pulse and generating a local oscillator by frequency multiplication of the sampling light pulse. The method further includes generating a signal wave by frequency mixing of the sampling light pulse and the test-waveform in a nonlinear optical element, wherein the frequency multiplication of the sampling light pulse and the frequency mixing of the sampling light pulse and the test-waveform are selected such that the local oscillator and the signal wave are at least partly spectrally overlapping. Moreover, the method includes detecting an interference signal of the local oscillator and the signal wave for various time delays of the sampling light pulse with respect to the test-waveform. A device for sampling a test-waveform is also disclosed.

15 Claims, 9 Drawing Sheets

(56) References Cited

U.S. PATENT DOCUMENTS

| | | | |
|---|---|---|---|
| 6,993,224 | B1 | 1/2006 | Duguay |
| 8,300,669 | B2 | 10/2012 | Dantus et al. |
| 9,683,896 | B2 | 6/2017 | Huber et al. |
| 10,014,653 | B2 | 7/2018 | Hartl et al. |
| 10,107,846 | B2 | 10/2018 | Vampa et al. |
| 10,294,915 | B2 | 5/2019 | Lee et al. |
| 10,389,514 | B2 | 8/2019 | Sinclair et al. |
| 10,481,463 | B2 | 11/2019 | Nejadriahi et al. |
| 10,488,259 | B2 | 11/2019 | Bartels et al. |
| 10,522,962 | B2 | 12/2019 | Krausz et al. |
| 10,644,793 | B2 | 5/2020 | Chaffee et al. |
| 10,796,190 | B2 | 10/2020 | Heshmat Dehkordi et al. |
| 11,002,665 | B2 | 5/2021 | Prater et al. |
| 11,264,221 | B2 | 3/2022 | Corkum et al. |
| 2002/0139924 | A1* | 10/2002 | Otani ........................ G01J 11/00 250/225 |
| 2003/0007205 | A1 | 1/2003 | Lee et al. |
| 2003/0038936 | A1 | 2/2003 | Jungerman et al. |
| 2008/0089698 | A1 | 4/2008 | Jiang et al. |
| 2013/0294467 | A1 | 11/2013 | Moloney et al. |
| 2017/0067783 | A1 | 3/2017 | Kozlov et al. |
| 2018/0122143 | A1 | 5/2018 | Ellwood, Jr. |
| 2018/0342848 | A1* | 11/2018 | Roth ................... H01S 3/10061 |
| 2019/0154439 | A1 | 5/2019 | Binder |
| 2019/0296512 | A1 | 9/2019 | Wong et al. |
| 2020/0088784 | A1 | 3/2020 | Lei |
| 2020/0110029 | A1 | 4/2020 | Lei |
| 2020/0186350 | A1 | 6/2020 | Wentz et al. |
| 2020/0259305 | A1* | 8/2020 | Piccoli .................. H01S 3/0057 |
| 2020/0345873 | A1 | 11/2020 | Ashrafi |
| 2020/0348505 | A1 | 11/2020 | Gopinath et al. |
| 2020/0378829 | A1 | 12/2020 | Decker et al. |
| 2020/0400732 | A1 | 12/2020 | Koldiaev et al. |
| 2021/0091952 | A1 | 3/2021 | Wentz |
| 2021/0100685 | A1 | 4/2021 | Serdarevic |
| 2021/0116543 | A1 | 4/2021 | Huang et al. |
| 2021/0118661 | A1 | 4/2021 | Corkum et al. |
| 2021/0215601 | A1 | 7/2021 | Prater et al. |

FOREIGN PATENT DOCUMENTS

| | | | |
|---|---|---|---|
| WO | 2016174660 | A1 | 11/2016 |
| WO | 2020150236 | A1 | 7/2020 |

OTHER PUBLICATIONS

International Preliminary Report on Patentability issued in PCT/EP2021/075105, to which this application claims priority, mailed Feb. 13, 2024.

A. Leitenstorfer et al., "Detectors and sources for ultrabroadband electro-optic sampling: Experiment and theory," Applied Physics Letters, vol. 74, Issue 11, pp. 1516 to 1518, Mar. 15, 1999.

N. Karpowicz et al., "Coherent Heterodyne Time-Domain Spectrometry Covering the Entire 'Terahertz Gap'," Applied Physical Letters, vol. 92, Issue 1, Jan. 7, 2008.

F. Krausz et al., "Attosecond physics," Review of modern Physics, vol. 81, No. 1, pp. 163-234, Feb. 2, 2009.

K. T. Kim et al., "Petahertz optical oscilloscope," Nature Photonics, vol. 7, No. 12, pp. 958 to 962, Nov. 3, 2013.

T. Paasch-Colberg et al., "Solid-state light-phase detector," Nature Photonics, vol. 8, pp. 214-218, Jan. 12, 2014.

T. Fuji et al., "Generation and Characterization of Phase-Stable Sub-Single-Cycle Pulses at 3000 cm," IEEE Journal of Selected Topics in Quantum Electronics, vol. 21, No. 5, Sep./Oct. 2015.

S. Keiber et al., "Electro-optic sampling of near-infrared waveforms," Nature Photonics, vol. 10, No. 3, pp. 159 to 163, Jan. 18, 2016.

M. Hassan et al., "Optical attosecond pulses and tracking the nonlinear response of bound electrons," Nature, vol. 530, pp. 66 to 70, Feb. 3, 2016.

I. Pupeza et al., "Field-resolved infrared spectroscopy of biological systems," Nature, vol. 577, pp. 52 to 59, Jan. 1, 2020.

S. Sederberg et al., "Attosecond optoelectronic field measurement in solids," Nature Communications, vol. 11, No. 430, Jan. 22, 2020.

M. Mamaikin, "Time-Resolved Microscopy of Near-Infrared to Visible Waveforms," Doctoral thesis, Apr. 27, 2020.

D. Zimin, "Non-linear optical sampling", Doctoral thesis, Mar. 25, 2021.

C. Beckh et al., "Analysis of Subcycle Electro-Optic Sampling Without Background," Journal of Infrared, Millimeter, and Terahertz Waves, vol. 42, No. 6, pp. 701 to 714, Apr. 7, 2021.

D. Zimin et al., "Ultra-broadband photonic sampling of optical waveforms," Physics Optics, https://arxiv.org/abs/2111.09864, Nov. 18, 2021.

International Search Report and Written Opinion issued in PCT/EP2021/075105, to which this application claims priority, mailed May 13, 2022.

* cited by examiner

METHOD AND DEVICE FOR PHOTONIC SAMPLING OF A TEST WAVE-FORM

CROSS REFERENCE TO RELATED APPLICATIONS

This application is a continuation application of international patent application PCT/EP2021/075105, filed on Sep. 13, 2021, designating the United States and claiming priority from international patent application PCT/EP2021/072955, filed Aug. 18, 2021, and the entire content of both applications is incorporated herein by reference.

TECHNICAL FIELD

Provided are exemplary embodiments of a method for photonic sampling of a test-waveform, a device for photonic sampling of a test-waveform, a use of a local oscillator, and a use of nonlinear optical processes for generating a local oscillator and a signal wave. The exemplary embodiments are, thus, related to methods for photonic measurements.

BACKGROUND

Direct access to the electric field of light is desirable for instance for revealing a subcycle view of light-matter interaction, enabling sensitive metrology in physics, chemistry, and medicine. Techniques for revealing the temporal evolution of the electric field based on laser-induced carriers typically take advantage of nonlinear temporal gating in the excitation process to expand the detectable bandwidth, but the signal is limited by interactions between the particles and thermal effects arising from the deposition of energy into the medium. Alternative approaches involve photonic methods. Such photonic methods use extreme ultraviolet (Kim, K. T. et al. "Petahertz optical oscilloscope," Nat. Photonics 7, 958-962) or especially optical pulses (Leitenstorfer, A., Hunsche, S., Shah, J., Nuss, M. C. & Knox, W. H. "Detectors and sources for ultrabroadband electro-optic sampling: Experiment and theory," Appl. Phys. Lett. 74, 1516-1518) and can overcome these limitations since the light field carries the energy away to a photodetector. This may lead to an increase in sensitivity (Pupeza, I. et al. "Field-resolved infrared spectroscopy of biological systems," Nature 577, 52-59, (2020)) but comes along with a strict limit on the maximum frequency of operation imposed by the duration of the pulse used to sample the waveform.

Heterodyne sampling techniques are known in related art in the infrared and Terahertz range, such as electro-optic sampling (EOS) techniques (Leitenstorfer, A., Hunsche, S., Shah, J., Nuss, M. C. & Knox, W. H. "Detectors and sources for ultrabroadband electro-optic sampling: Experiment and theory," Appl. Phys. Lett. 74, 1516-1518). Other techniques are known as air-biased-coherent detection (ABCD) techniques (Karpowicz, N. et al. "Coherent heterodyne time-domain spectrometry covering the entire 'terahertz gap'," Appl. Phys. Lett. 92, 011131).

These techniques arise from the interference of a nonlinearly generated signal, which emerges from the interaction of the test-waveform under investigation with the sampling light pulse, with a local oscillator (LO) produced solely by the sampling light pulse. In EOS, the signal is produced from sum and difference frequency generation between the waveform and sampling light pulse, and the LO is provided by the unperturbed sampling light pulse (Keiber, S. et al. "Electro-optic sampling of near-infrared waveforms," Nat. Photonics 10, 159-162 (2016)). In ABCD, the signal is the result of four-wave mixing, summing two photons from the sampling light pulse and subtracting one from the test waveform, while the LO is obtained from an external static electric field, which biases an interaction between the test wave form and the sampling light pulse.

These techniques are limited regarding their detection bandwidth and in addition require carrier-envelope-phase stabilized light pulses.

SUMMARY

The problem solved by the invention, thus, relates to providing a reliable and facilitated method and a device for photonic sampling of a test-waveform offering a large flexibility regarding the spectral detection bandwidth.

This problem is solved by a method for photonic sampling of a test-waveform, a device for photonic sampling of a test-waveform, a use of a local oscillator and a use of nonlinear optical processes for generating a local oscillator and a signal wave having the features of the respective independent claim. Exemplary embodiments are provided in the dependent claims and the description.

One exemplary embodiment relates to a method for photonic sampling of a test-waveform. The method comprises providing a sampling light pulse and generating a local oscillator by frequency multiplication of the sampling light pulse. The method further comprises generating a signal wave by frequency mixing of the sampling light pulse and the test-waveform in a nonlinear optical element, wherein the frequency multiplication of the sampling light pulse and the frequency mixing of the sampling light pulse and the test-waveform are selected such that the local oscillator and the signal wave are at least partly spectrally overlapping. Moreover, the method comprises detecting a interference signal of the local oscillator and the signal wave for various time delays of the sampling light pulse with respect to the test-waveform.

Another exemplary embodiment relates to a device for photonic sampling of a test-waveform. The device comprises a delay stage for varying a temporal delay of a sampling light pulse with respect to the test-waveform and a solid nonlinear optical element for generating a local oscillator by frequency multiplication of the sampling light pulse and for generating a signal wave by frequency mixing photons of the test-waveform and the sampling light pulse such that the local oscillator and the signal wave are at least partly spectrally overlapping. The device further comprises a heterodyne detector for detecting an interference signal of the spectrally overlapping local oscillator and the signal wave for various temporal delays of the sampling light pulse with respect to the test-waveform.

Yet another exemplary embodiment relates to a use of a local oscillator being spectrally centered in the ultraviolet spectral range for photonic sampling of a test-waveform being spectrally centered in the near-infrared or visible spectral range.

Yet another exemplary embodiment relates to a use of nonlinear optical processes in a solid nonlinear optical element for generating a local oscillator and a signal wave for a heterodyne detection for photonic sampling of a test-waveform spectrally centered in the near-infrared or visible spectral range.

Photonic sampling means that a temporal evolution of the test-waveform and/or an envelope function of the test-waveform are retrieved by sampling the test waveform using a sampling light pulse and/or a light pulse generated by the sampling light pulse.

The test-waveform is a light pulse, whose temporal development of the electric field and/or the envelope function shall be measured. The test-waveform and the sampling light pulse may be based on the same light pulse and/or may originate from the same light source. The test-waveform and the sampling light pulse may be in a coherent relationship with each other and/or may exhibit a fixed and/or determined phase relationship and/or carrier envelope phase relationship with each other. For instance, the test-waveform may have undergone an interaction with matter prior to the photonic sampling process in order to investigate the interaction of the test-waveform with the matter by photonic sampling of the test waveform. The sampling pulse may be a few-cycle light pulse having a pulse duration (FWHM) of only few femtoseconds, such as 3 fs or less. The sampling light pulse can also have longer durations, such as for example 100 fs, as long as the spectral bandwidth of the sampling light pulse is suitable for generating a local oscillator and ha interference signal having a spectral overlap. The frequencies, which are specified throughout this disclosure, are provided in the unit 1/s and not as an angular frequency, unless explicitly specified otherwise.

The signal wave is a light wave, which is used as the signal wave in the heterodyne detection process. The signal wave may be used as a heterodyne signal for a heterodyne detection. The signal wave is based on the sampling light pulse and the test-waveform. The frequency mixing for generating the signal wave is a nonlinear optical process and may be performed in a nonlinear optical element. For instance, the frequency mixing may be based on three-wave-mixing and/or four wave-mixing and or any higher order of wave-mixing process.

The local oscillator is a light pulse used as the local oscillator in a heterodyne detection process for obtaining the interference signal. Generating the local oscillator by frequency multiplication. The frequency multiplication is a nonlinear optical process and involves multiple photons of the sampling light pulse. In particular, the generation of the local oscillator does not involve photons of the test-waveform. The frequency multiplication may be second harmonic generation, third harmonic generation, fourth harmonic generation and/or a higher order of harmonic generation. According to some exemplary embodiments, the frequency multiplication may be performed in a nonlinear optical element, which may be a solid or liquid or gaseous nonlinear optical element. Optionally, the frequency multiplication may be a nonlinear optical process based on a higher order susceptibility of the nonlinear optical element, such as for instance the second, third or fourth order susceptibility of the nonlinear optical element.

The interference signal is a signal, which is detected by a heterodyne detector. In other words, a varying optical intensity at the heterodyne detector and/or an electrical signal provided by the heterodyne detector in response to the varying optical intensity due to an interference of the sampling local oscillator and the signal wave may be regarded as the interference signal. In the heterodyne detection concept, there is a local oscillator and a heterodyne signal. The heterodyne signal is a signal that is produced by mixing of sampling and test pulses, which is referred to as the signal wave throughout this disclosure. This signal wave then interferes with a local oscillator originating from the sampling light pulse only. The time delay between the signal wave and a local oscillator, which originates in a time delay between the sampling light pulse and the test waveform, results in a modulation of an intensity on the heterodyne detector. Detecting the interference signal for various time delays of the sampling light pulse with respect to the test-waveform means that the sampling light pulse may be temporally delayed with respect to the test-waveform for different measurements or vice versa. Accordingly, the photonic sampling process may involve a stepwise sampling of the test-waveform with a stepwise varied temporal delay of the sampling light pulse.

The exemplary embodiments provide the advantage that the usable spectral range of photonic sampling can be significantly extended as compared to conventional photonic sampling techniques. Accordingly, a reliable and sensitive technique for determining the temporal evolution of the electrical field and/or the envelope function of test-waves is provided, which may be applied to test-waveforms having frequencies in the Petahertz range. In other words, the exemplary embodiments allow providing a reliable and sensitive technique for photonic sampling which is applicable to test-waveforms having a central frequency in the visible and/or in the ultraviolet spectral range.

The exemplary embodiments provide the advantage that by generating the local oscillator by frequency multiplication and generating the signal wave by frequency mixing a large flexibility regarding the spectral range of the test-waveform can be provided. Choosing between various nonlinear optical processes for the frequency multiplication and the frequency mixing allows selecting suitable frequencies for the generated local oscillator and the generated signal wave having a spectral overlap for generating a interference signal. Hence, the exemplary embodiments provide a tunable technique for photonic sampling, which may be tuned to provide a suitable interference signal even for test-waveforms having a central frequency in the Petahertz range.

For instance, the exemplary embodiments may be suitable for photonic sampling of test-waveforms having a central frequency in a range extending from 0.3 PHz to at least 1 PHz.

In particular, the exemplary embodiments provide the advantage that physical processes occur at different time scales can be studied by photonic sampling, which are not accessible by conventional sampling methods, such as EOS and ABCD. Electronic processes typically occur in attosecond or femtosecond time scales, therefore to study these processes PHz-scale bandwidth is required. EOS and ABCD do not provide this bandwidth, therefore these techniques cannot be used to study very fast processes. The exemplary embodiments provide the advantage that they enable a suitable spectral bandwidth allowing photonic sampling in the PHz frequency range and therefore make a manifold of processes to be accessible. In other words, the exemplary embodiments significantly extend the frequency range, in which photonic sampling of test-waveforms is possible.

In an exemplary embodiment the one or more of the following harmonics of the sampling light pulse are provided by the frequency multiplication as the local oscillator: second harmonic, third harmonic, fourth harmonic. According to other exemplary embodiments, even higher orders of harmonics may be used for generating the local oscillator. Selecting one of various orders of harmonics provides a large degree of flexibility for providing the local oscillator at a frequency having a spectral overlap with the signal wave to generate the interference signal. The nonlinear optical process for generating the local oscillator may be selected depending on the frequency range of the signal wave, such that a spectral overlap between the signal wave and the generated local oscillator is ensured.

In an exemplary embodiment the signal wave is provided by at least one of the following frequency mixing processes: sum frequency generation, difference frequency generation, four wave mixing involving the sum of two photons of the sampling light pulse and one photon of the test-waveform, four wave mixing involving the difference of two photons of the sampling light pulse and one photon of the test-waveform; cross phase modulation. According to other exemplary embodiments, any other frequency mixing can be used for generating the signal wave. The nonlinear optical process used for generating the signal wave may be selected depending on the central frequency of the test-waveform and the sampling light pulse, as well as in dependence of the spectral sensitivity of the heterodyne detector. This provides a high degree of flexibility and tunability and, thus, allows photonic sampling of test-waveforms in a wide frequency range and in particular at high frequencies in a range from 0.3 PHz to 1 PHz and at even higher frequencies.

In an exemplary embodiment the frequency multiplication of the sampling light pulse is carried out in the same nonlinear optical element as the frequency mixing of the sampling light pulse and the test-waveform. This allows providing a compact setup and further facilitates maintaining a close temporal and spatial relationship between the signal wave and the local oscillator. In particular, this reduces a possible timing jitter and/or a possible spatial overlap and pointing instability of the signal wave and the local oscillator. In an exemplary embodiment, the test-waveform and the sampling light pulse may carry out various different nonlinear optical processes in the nonlinear optical element, wherein not all of the resulting wave-mixing products may be used for the generation of the signal wave and the local oscillator. In some exemplary embodiments, only the desired wave-mixing products or parts of them may be isolated, for instance by spectral and/or polarization filtering the wave-mixing products, which are intended for a use in generating the interference signal.

In an exemplary embodiment the nonlinear optical element comprises or consists of a solid nonlinear optical element. This provides the advantage that a high nonlinear susceptibility can be provided which may result in a high conversion efficiency from the sampling light pulse and the test-waveform into the wave-mixing products to be used as local oscillator and/or signal wave. Moreover, this provides the advantage that a solid nonlinear optical element may be easily implemented in a setup and requires no steady supply of consumables (such as gases) and does not require any technical preparations for isolating the setup against fluids. According to some exemplary embodiments, several solid nonlinear optical elements may be used. Alternatively or additionally one or more gaseous and/or one or more liquid nonlinear optical elements may be used.

In an exemplary embodiment the solid nonlinear optical element has a thickness of 100 μm or less, optionally of 50 μm or less and optionally of 10 μm or less. This provides the advantage that possible requirements regarding phase-matching the different waves within the nonlinear optical element are lowered. In particular, the thickness of the nonlinear optical element may be chosen such that no particular phase matching is required, since the chosen thickness limits the dephasing of the sampling light pulse and the test-waveform within the nonlinear optical element to an extent maintaining a high conversion efficiency.

In an exemplary embodiment the solid nonlinear optical element has a thickness of more than 100 μm and is provided in an angle satisfying a phase matching condition for the test-waveform and the sampling light pulse. This results in a particularly high conversion efficiency and, hence, in a particularly high signal strength of the signal wave and the local oscillator. However, according to other exemplary embodiments the detection can also be performed in a nonlinear optical element not satisfying a phase-matching condition, which will then limit the conversion efficiency and, hence, the obtainable signal strength of the signal wave and the local oscillator.

The nonlinear optical element may for instance comprise or consist of one of the following materials: quartz, $TiO_2$, BBO, LBO, ZnSe, or YAG. For four-wave-mixing processes a large variety of materials can be used, because most materials have $\chi^{(3)}$ non-linearity. Some materials also have $\chi^{(2)}$ non-linearity and, thus, allow more mixing processes.

In an exemplary embodiment the test-waveform is spectrally centered in the near-infrared or the visible spectral range. Alternatively or additionally the sampling light pulse is spectrally centered in the near-infrared or the visible spectral range. Such spectral ranges of the test-waveform and/or the sampling light pulse may result in the signal wave being in a spectral range from 0.5 PHz to 1 PHz or even higher. Accordingly, in some exemplary embodiments the local oscillator and/or the signal wave are spectrally centered in the visible or ultraviolet spectral range. Hence, photonic sampling of such test-waveforms may not be possible using conventional photonic sampling methods using the fundamental sampling light pulse as the local oscillator. Therefore, using the photonic sampling method or device provides the advantage that also such test-waveforms being spectrally centered in the near-infrared, the visible and/or the ultraviolet spectral range may be sampled by photonic sampling. In principle, the test-waveforms of any spectral range may be sampled as long as the spectral overall between the generated local oscillator and the signal wave can be achieved and a suitable detector being sensitive at the overlap frequency is provided.

In an exemplary embodiment the method further comprises spectrally filtering and/or polarization filtering at least the spectrally overlapping components of the local oscillator and the signal wave prior to heterodyne detection. Accordingly, in an exemplary embodiment the device further comprises a spectral filter for spectrally filtering the spectrally overlapping components of the local oscillator and the signal wave prior to heterodyne detection. Alternatively or additionally the device further comprises a polarization filter for polarization filtering at least a part of the spectrally overlapping local oscillator and the signal wave prior to heterodyne detection. This allows selecting desired wave-mixing products to be used as local oscillator and/or as the signal wave from a larger number of wave-mixing products, which the test-waveform and/or the sampling light pulse may generate in the nonlinear optical element. Hence, this allows choosing the desired frequencies for the local oscillator and/or the signal wave while reducing or avoiding a possible interaction with further wave-mixing products and/or the fundamental test-waveform and/or the fundamental sampling light pulse at the heterodyne detector. Alternatively or additionally the spectrally and/or polarization filtering allows isolating a desired spectral overlap region, in which the signal wave and the local oscillator spectrally overlap from further spectral components of the signal wave and/or the local oscillator.

In an exemplary embodiment, the test-waveform and the sampling light pulse are based on CEP-stabilized (CEP=carrier envelope phase) laser pulses. In particular, the test-waveform and the sampling light pulse may originate in the very same laser pulse, which may be emitted by a CEP-stabilized laser oscillator. This allows using different numbers of photons of the sampling light pulse for generating the local oscillator and the signal wave, which may result in a phase shift between the signal wave and the local oscillator originating in the CEP of the CEP-stabilized laser pulses. In particular, in this case the nonlinear order of the wave-mixing processes for generating the local oscillator and the signal wave may be different from each other. The nonlinear order is given by the number of photons involved in the nonlinear optical processes. In other words, the nonlinear order may depend on the order of the nonlinear optical susceptibility. For example, a three-wave-mixing process based on the second order susceptibly may be a second order nonlinear process. For example, a four-wave-mixing process based on the third order susceptibly may be a third order nonlinear process. As the CEP is stabilized and can be determined, the effect arising from the phase shift can be compensated when retrieving the measured data from the interference signal. Accordingly, this provides the benefit that a flexibility of combining local oscillator frequencies and signal wave frequencies is increased, since no requirement to maintain the number of involved sampling light pulse photons exists. For instance, in an exemplary embodiment the local oscillator may be generated by third harmonic generation (THG) from the sampling light pulse, thus a third order NLO process involving three photons of the sampling light pulse, and the signal wave may be generated by sum-frequency-generation (SFG) of the test-waveform and the sampling light pulse, thus a second order NLO process involving one photon of the sampling light pulse and one photon of the test-waveform. Due to the different nonlinear orders involved in the generation of the local oscillator and the signal wave, the CEP will not cancel out but result in a phase shift between the local oscillator and the signal wave and, hence, affect the interference signal. Since, however, the CEP can be determined and/or controlled, the phase shift can be considered in the evaluation of the interference signal.

In an exemplary embodiment only one photon of the test-waveform is involved in generating a photon of the signal wave. This ensures a linear detection of the electrical field of the test-waveform and, hence, allows retrieving a signal which is directly proportional to the electric field of the test-waveform.

In an exemplary embodiment a nonlinear order for generating the local oscillator is identical to the nonlinear order (NLO order) generating the signal wave. This provides the advantage that possible effects originating in the CEP phase of the sampling light pulse and the test-waveform affect the generated local oscillator and/or the generator signal wave in an identical manner and, thus, cancel out. Accordingly, this provides the benefit that stabilizing and/or controlling and/or determining the CEP is not required and, hence, there is no need of CEP-stabilized laser pulses for providing the test-waveform and the sampling light pulse, as long as a possible source for instabilities is the same for the sampling light pulse and the test-waveform. Consequently, the hardware requirements for the laser system used to provide the sampling light pulse and the test-waveform are reduced. This allows using cheaper and/or more compact systems for photonic sampling.

In an exemplary embodiment the heterodyne detector comprises a photodetector for providing an electric signal based on the spectrally overlapping local oscillator and the signal wave interfering at the photodetector. The photodetector may for instance comprise or consist of one or more of the following detectors: a photomultiplier, a photodiode, a CCD array, a CMOS array. A suitable heterodyne detector may be chosen such as to have a high sensitivity in the spectral region of the interference signal.

In the following, further background information regarding the photonic sampling according to presented exemplary embodiments and in comparison with conventional sampling methods are provided. However, the presented exemplary embodiments are not limited to details provided in these explanations.

The exemplary embodiments presented in this disclosure are referred to in the following as generalized heterodyne optical sampling techniques (GHOSTs). The GHOST are based on the same fundamental principles as the sampling methods used in conventional infrared and terahertz sampling techniques, such as electro-optic sampling (EOS) and air-biased-coherent-detection (ABCD).

These techniques arise from the interference of a nonlinearly generated signal, which emerges from the interaction of the test-waveform with the sampling light pulse, wherein the local oscillator (LO) for a heterodyne detection is generated solely by the sampling light pulse.

In EOS, the signal is produced from sum and difference frequency generation between the test-waveform and the sampling light pulse, and the LO is provided by the unperturbed sampling light pulse. In ABCD, the signal is the result of four-wave mixing, summing two photons from the sampling light pulse and subtracting one from the test waveform, while the LO is provided by using an external static electric field, which biases an interaction between the test-waveform and the sampling light pulse. These techniques share the following two properties:

1) only one photon from the test waveform is involved in the generation of the signal, and
2) the same number of photons from the sampling light pulse is involved in forming the LO and signal wave, which gives them the same phase relationship to the input field.

Property 1 allows a linear detection of the electric field of the test-waveform. Property 2 allows the carrier-envelope phase (CEP) of the sampling light pulse, or for arbitrary waveforms, the global phase (see Hassan, M. T. et al. "Optical attosecond pulses and tracking the nonlinear response of bound electrons," Nature 530, 66-70 (2016)), to cancel during heterodyne detection, meaning that pulses with unstable CEP can be used for providing the test-waveform and the sampling light pulse. When both these properties are fulfilled, the interference between the signal wave and the local oscillator, which forms the basis of heterodyne detection, has an amplitude and a phase determined by the test-waveform, and varying the time delay between the test-waveform and the sampling light pulse while recording the resulting intensity measures the electric field of the test-waveform.

Property 2 accounts for the primary limit on the maximum detection frequency of the techniques: since the signal wave and the LO wavelengths must overlap, and the signal frequency is shifted by the frequency of the test-waveform, the spectral bandwidth of the local oscillator sets an upper limit of wavelengths, which can be sampled.

However, according to exemplary embodiments of the present disclosure, the local oscillator is generated by frequency multiplication of the sampling light pulse, which, hence, allows significantly shifting the frequencies of LO to higher frequencies. In particular when using CEP-stabilized mode-locked laser oscillators for providing the sampling light pulses and the test-waveforms the conventional restrictions regarding the upper frequency limit of the conventional LO can be overcome. For example, using second harmonic generation (SHG) to form the LO for a signal based on sum-frequency generation (SFG), i.e., adding one more photon from the sampling light pulse to the LO as compared to EOS, increases the frequency of the spectral detection band by the carrier frequency of the sampling light pulse in a GHOST which we label SFG+SHG. For example, a sampling light pulse having a pulse duration of less than 5 fs at 400 THz carrier frequency and 200 THz bandwidth, capable of detecting 0-200 THz via conventional EOS, could in principle detect 100-700 THz via the SFG+SHG GHOST technique (see FIGS. 1A to 1C and further explanations below) or 900-1500 THz via a GHOST technique based on a signal wave generated by difference frequency generation (DFG) and a local oscillator generated by SHG, i.e., DFG+SHG GHOST. A different number of photons of the sampling light pulse involved in the generation of the signal wave and the local oscillator, respectively, give rise to an influence originating from possible CEP shifts of the laser pulses, on which the sampling light pulses are based. In this case, the resulting CEP of the LO and the signal wave experience a different phase shift upon a change of the CEP of the sampling light pulse. As a result, a phase shift $$\Delta\phi_{CE}=\alpha(N_S-N_{LO})\phi_S$$

is applied to the measured test-waveform, where $N_S$ is the number of sampling light pulse photons summed over to arrive at a signal wave photon, $N_{LO}$ is the number summed over to obtain a LO photon, and α is 1 or −1 depending on the mixing process, and $\phi_S$ is the CEP of the sampling light pulse. Further details are provided below.

In both EOS and ABCD, $\Delta\phi_{CE}=0$, while in the SFG+SHG GHOST, $\Delta\phi_{CE}=-\phi_S$. This has a straightforward interpretation in the time domain: in any linear electric field measurement, the detected waveform is the convolution of the true electric field with the response function of the detection system. The addition of an unbalanced photon in the detection scheme causes this response function to oscillate in time, which allows for the detection of more rapidly varying fields, but repeated measurements of fields with reproducible (CEP-stabilized) waveforms will average to zero if $\phi_S$ is not stabilized. From the response function, the actual field of the test-waveform may be retrieved by applying conventional deconvolution method, which is known from electro-optical sampling, as for instance described in the following publications:

- Nature Photonics 10, pages 159-162 (2016); Beckh, C. et al. "Analysis of Subcycle Electro-Optic Sampling Without Background," J Infrared Milli Terahz Waves (2021);
- A. Leitenstorfer et al.: "Detectors and sources for ultrabroadband electro-optic sampling: Experiment and theory," Appl. Phys. Lett. 74, 1516 (1999);

The method for photonic sampling according to some exemplary embodiments, which is referred to as GHOST, offers a high flexibility regarding the spectral range, in which a test-waveform may be sampled. In particular, due to the flexible options for combining different frequencies of the local oscillator (LO) and the signal wave, various frequency ranges may be provided, which are referred to as various GHOST channels. These channels may be used by selecting the respective nonlinear optical process for generating the LO by frequency multiplication and selecting the respective nonlinear optical process for generating the signal wave by wave-mixing, as presented in the following table:

| LO | Signal wave | Scaling | Lower BW limit | Higher BW limit | $\Delta\Phi_{CE}$ |
|---|---|---|---|---|---|
| SHG | SFG | $E_T E_S^3$ | $\omega-\frac{3}{2}\Delta_\omega$ | $\omega+\frac{3}{2}\Delta_\omega$ | $-\Phi_S$ |
| SHG | DFG | $E_T E_S^3$ | $3\omega-\frac{3}{2}\Delta_\omega$ | $3\omega+\frac{3}{2}\Delta_\omega$ | $\Phi_S$ |
| THG | SFG | $E_T E_S^4$ | $2\omega-2\Delta_\omega$ | $2\omega+2\Delta_\omega$ | $-2\Phi_S$ |
| THG | DFG | $E_T E_S^4$ | $4\omega-2\Delta_\omega$ | $4\omega+2\Delta_\omega$ | $4\Phi_S$ |
| SHG | FWM+; FWM− | $E_T E_S^4$ | 0 | $2\Delta_\omega$ | 0 |
| THG | FWM+ | $E_T E_S^5$ | $\omega-\frac{5}{2}\Delta_\omega$ | $\omega+\frac{5}{2}\Delta_\omega$ | $-\Phi_S$ |
| THG | FWM− | $E_T E_S^5$ | $5\omega-\frac{5}{2}\Delta_\omega$ | $5\omega+\frac{5}{2}\Delta_\omega$ | $5\Phi_S$ |
| THG | XPM | $E_T E_S^5$ | $3\omega-\frac{5}{2}\Delta_\omega$ | $3\omega+\frac{5}{2}\Delta_\omega$ | $-3\Phi_S$ |

Each row represents a respective GHOST channel. The LO column indicates the nonlinear optical process selected for generating local oscillator, the "signal wave" column indicates the nonlinear optical process selected for generating signal wave. The "scaling" column indicates the proportionality of the obtained signal with the field strength of the test-waveform and the sampling light pulse. The lower and higher BW limit indicate the lower/higher frequency bandwidth limit, which may be detected using the respective channel. The $\Delta\phi_{CE}$ column indicates the occurring shift of the CEP of the measured waveform relative to the actual electric field. The following abbreviations are used:

- SHG second harmonic generation
- THG third harmonic generation
- SFG sum frequency generation
- DFG difference frequency generation
- FWM+ four-wave-mixing, including adding two sampling light pulse photons and adding one test-waveform photon
- FWM− four-wave-mixing, including adding two sampling light pulse photons and subtracting one test-waveform photon
- XPM cross-phase-modulation
- ω central angular frequency of the sampling light pulse
- $\Delta_\omega$ angular frequency bandwidth of the sampling light pulse
- $\Delta\Phi_{CE}$ shift of the CEP of the measured waveform relative to the actual electric field, which depends on the CEP of the sampling light pulse $\Phi_S$ As can be seen in the table, according to some exemplary embodiments different GHOST channels may scale differently with intensity of the sampling light pulse, and/or may have different spectral detection limits, and/or may have a different CEP offsets, which may be an integer multiple of the CEP of the sampling light pulse. The table summarizes several GHOST channels based on SHG and THG local oscillators. According to other exemplary embodiments, further GHOST channels based on higher harmonic orders for the LO may be provided. The bandwidth limits are exemplarily established for the case of a rectangular spectrum of the sampling light pulse, having a constant amplitude in the range from $\omega-\frac{1}{2}\Delta_\omega$ to $\omega+\frac{1}{2}\Delta_\omega$ and zero otherwise. The highest and lowest detectable frequencies according to these exemplary embodiments may then be given by the signals overlapping with the extrema of the up-converted local-oscillator band. The tabulated bandwidth values are those values at which such a signal is not strictly zero. For a real pulse, the shape of the spectral response may depend on both its spectral amplitudes and spectral phases, as well as the phase-matching conditions of the nonlinear medium, filtration, and a photodetector response.

It is understood by a person skilled in the art that the above-described features and the features in the following description and figures are not only disclosed in the explicitly disclosed exemplary embodiments and combinations, but that also other technically feasible combinations as well as the isolated features are comprised by the disclosure. In the following, several exemplary embodiments and specific examples are described with reference to the figures for illustrating the disclosure without limiting the disclosure to the described exemplary embodiments.

BRIEF DESCRIPTION OF THE DRAWINGS

Further exemplary embodiments will be illustrated in the following with reference to the drawings.

DESCRIPTION OF EXEMPLARY EMBODIMENTS

Figure 1A:
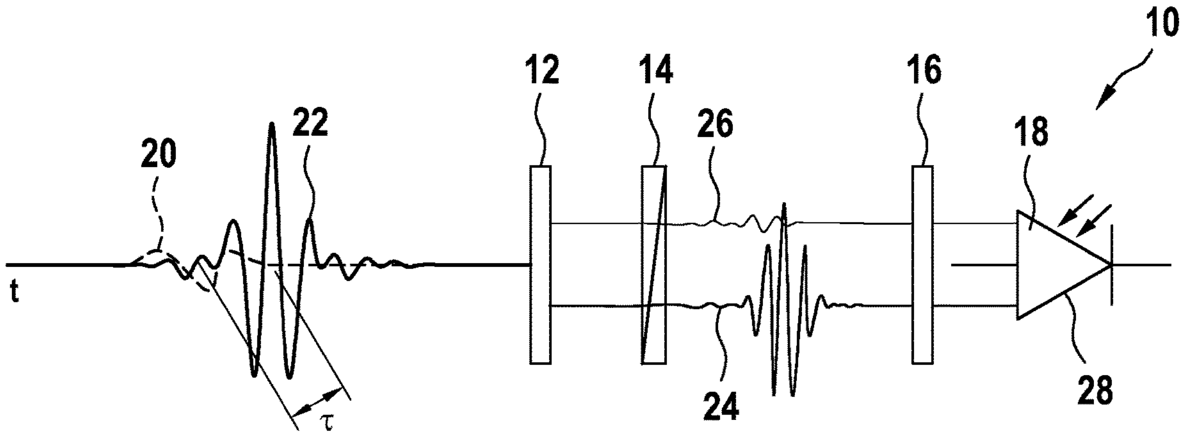
FIGS. 1A to 1C schematically illustrate the principle of a method for photonic sampling of a test-waveform according to an exemplary embodiment.

In the drawings the same reference signs are used for corresponding or similar features in different drawings.

Figure 1B:
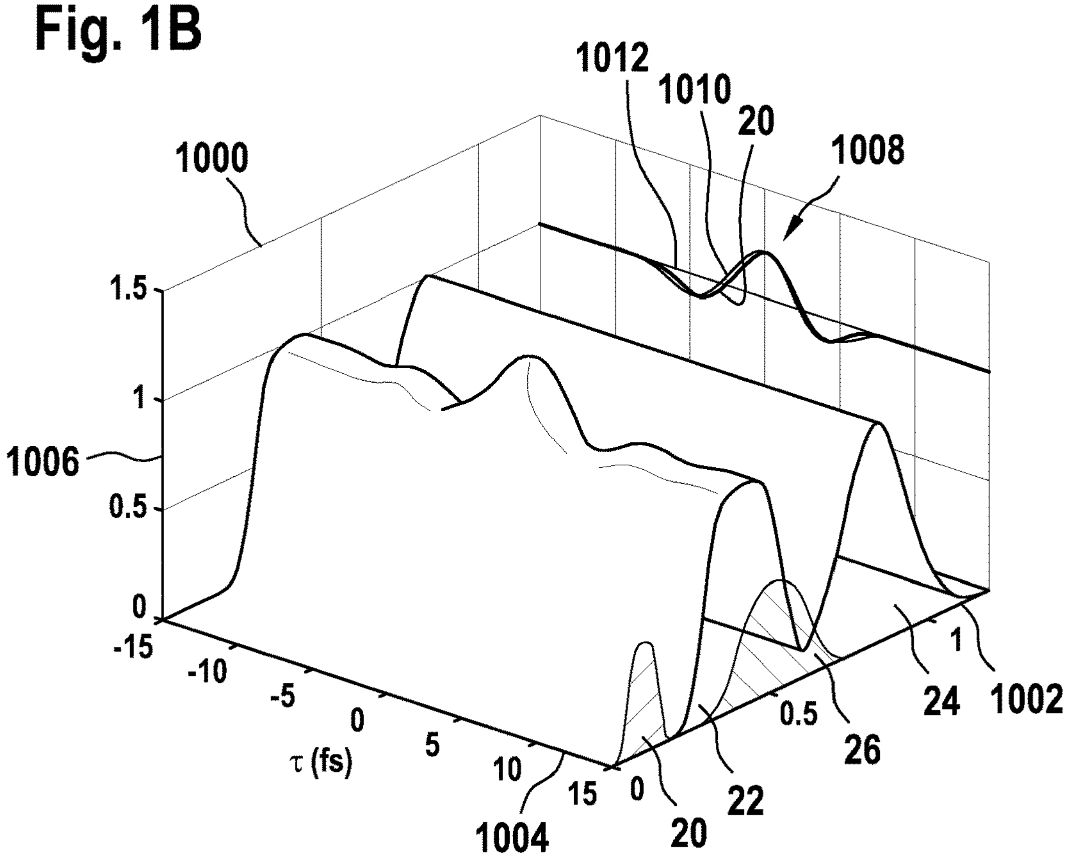
Figure 1C:
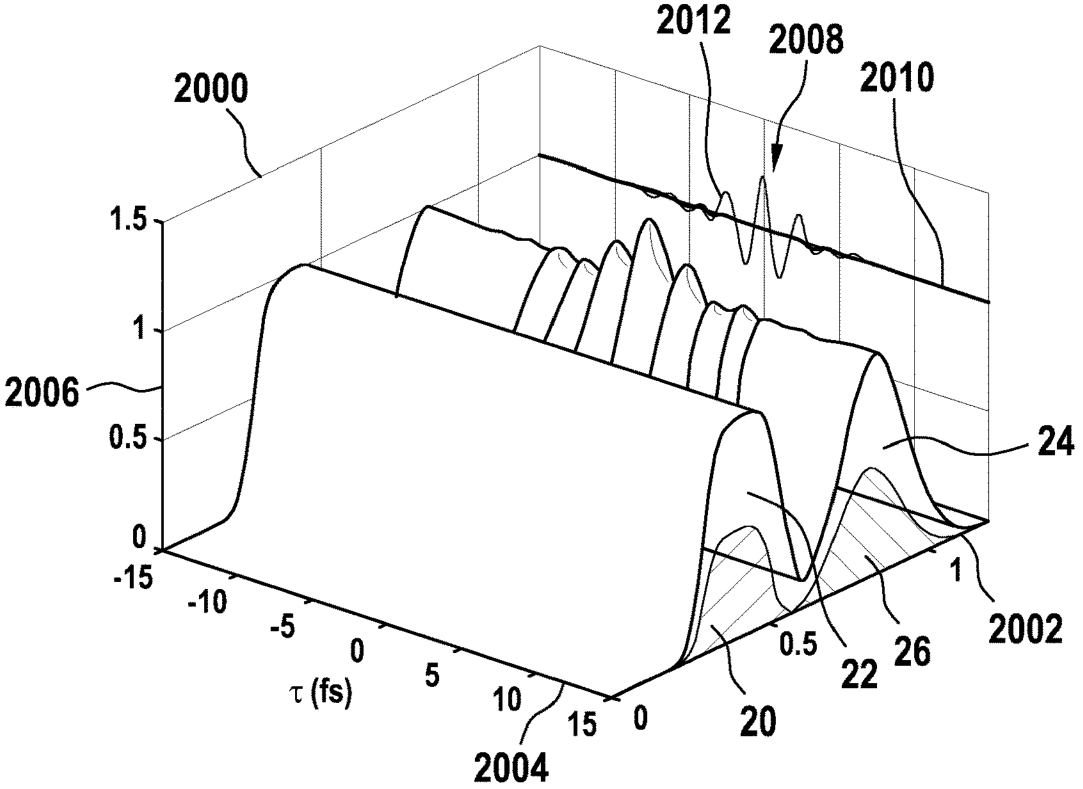

FIGS. 1A to 1C schematically illustrate the principle of a method for photonic sampling of a test-waveform according to an exemplary embodiment using a device 10 for photonic sampling of a test-waveform according to an exemplary embodiment. The device 10 comprises a nonlinear optical element 12, a polarizer 14, a spectral filter 16 and a heterodyne detector 18. The test-waveform, whose temporal development of the electric field shall be measured, is indicated with reference sign 20. The method comprises providing a sampling light pulse 22, having a variable temporal delay t with respect to the test-waveform 20 and which may be varied in consecutive measurements by a delay stage (not shown). The temporally and spatially overlapping test-waveform 20 and sampling light pulse 22 propagate through the nonlinear optical element 12 and, thus, generate an optical wave as a wave-mixing product by frequency multiplication of the sampling light pulse 20, which will be used as a local oscillator 24 (LO), and generate a signal wave 26 as a wave-mixing product by frequency mixing of the sampling light pulse 22 and the test-waveform 20. A further optional propagation of the generated LO 24 and the signal wave 26 emerging from the nonlinear optical element 12 through the polarizer 14 and the spectral filter 26 allows isolating the desired wave-mixing products, which are intended for the use as LO 24 and signal wave 26 from possible further wave-mixing products generated by the sampling light pulse 22 and/or the test-waveform 20. Alternatively or additionally, the polarizer 14 and/or the spectral filter 16 may isolate a spectral region, in which the LO 24 and the signal wave 26 spectrally overlap, which is intended for generating a interference signal. The temporally and spatially overlapping LO 24 and signal wave 26 or at least a spectrally overlapping part thereof impinge on the heterodyne detector 18 after passing the polarizer 14 and the spectral filter 16. The heterodyne detector 18 may for instance comprise a photodetector, which may be a photodiode 28, for generating an electric signal based on the as the interference signal generated by the LO 24 and signal wave 26 interfering at the heterodyne detector 18. The interference signal may then be used for retrieving information about the electric field of the test-wave 20 at the respective time delay τ. The measurement may be repeated for various time delays t to retrieve information about the full temporal development of the test-waveform's field. Moreover, the measurements may be repeated multiple times and averaged for the same time delay t for improving the signal quality.

FIGS. 1B and 1C illustrate the involved light waves in frequency domain and time domain for different spectra of the test-waveform 20, i.e., for a test-waveform having a low central frequency (FIG. 1B), such as 0.1 PHz, and for a test-waveform having a higher central frequency (FIG. 1C), such as 0.45 PHz, respectively. The diagrams presented in FIGS. 1B and 1C each present a three-dimensional graph 1000, 2000 showing the frequency spectrum in PHz on axis 1002, 2002 the time delay t in femtoseconds on axis 1004, 2004 and a normalized intensity on axis 1006, 2006. The inlays 1008 and 2008 exemplarily indicate the obtainable signals of the respective scenarios when measured with electro-optical sampling (EOS) 1010, 2010 and with SFG-SHG GHOST 1012, 2012 compared to the temporal development of the test-waveform 20.

The diagrams 1000, 2000 of the spectral intensity distribution show the spectra of the test-waveform 20, the sampling light pulse 22, the signal wave 26 generated by Sum-frequency generation (SFG) from the sampling light pulse 22 and the test-waveform 20, and the LO 24 generated by second harmonic generation (SHG) of the sampling light pulse 22.

In the low-frequency case presented in FIG. 1B the test-waveform is spectrally centered at about 0.1 PHz, while the sampling light pulse 22 is spectrally centered at about 0.45 PHz. The signal wave 26 has a large spectral overlap with the sampling light pulse 22 and, thus, offers the option of generating a interference signal by the spectrally overlapping portion of the signal wave 26 and the sampling light pulse 22 according to conventional EOS. Consequently, the conventional EOS results in a good signal for retrieving the temporal development of the electric field of the test-waveform 20 for low frequencies, as shown in the inlay 1008. In contrast, the provided LO 24 generated by SHG of the sampling light pulse has only very limited spectral overlap with the signal wave 26, and thus the GHOST signal 1012 presented in the inlay 1008 is not suitable for retrieving the electrical field of the test-waveform.

FIG. 1C illustrates a high-frequency scenario, which deviates from the low-frequency scenario of FIG. 1B in the test-waveform having a higher frequency spectrum centered at about 0.4 PHz. The frequency spectrum of the used sampling light pulse 22 and the generated LO 24 remain unchanged. Also in this scenario the signal wave 26 is generated by SFG of the test-waveform 20 and the sampling light pulse 22, which accordingly is centered at a higher frequency at about 0.85 PHz. Due to the higher frequencies of the signal-wave 26, no spectral overlap with the fundamental sampling light pulse 22 is present and, thus, a conventional EOS signal 2010 is not suitable for retrieving the electric field of the test-waveform 20, as indicated in the inlay 2008. In contrast, the LO 24 generated by SHG of the sampling light pulse 22 offers an excellent spectral overlap with the signal wave 26, and therefore the SFG+SHG GHOST technique using the signal wave 26 and the LO 24 for generating a interference signal is well suited for retrieving the electrical field of the test-waveform 20 also for high frequencies, as indicated by graph 2021 in the inlay 2008.

The modulation of spectral intensity in the UV band for varying time delay t traces out the test-waveform 20, which allows retrieving the temporal development of the electrical field of the test-waveform 20. This can be extended to a detection of light in other spectral regions, which may be accessible by a different combination of nonlinear processes to produce spectrally overlapping signal and LO waves, i.e., other GHOST channels.

To confirm the validity of the methods according to the presented exemplary embodiments, i.e., the GHOST techniques, and to demonstrate that the bandwidth of GHOSTs can be extended to Petahertz frequencies, we have experimentally investigated SFG+THG and DFG+THG GHOSTs as exemplary embodiments, comprising a LO provided by third-harmonic generation (THG) and signal waves provided by sum-frequency generation (SFG) and difference frequency generation (DFG), respectively. The nonlinear optical element used for frequency mixing and frequency multiplication was a thin quartz crystal (more details provided further below), which exhibits low absorption at high detection frequencies and low optical dispersion. The retrieved information about the sampled test-waveforms are compared against those obtained through nonlinear photoconductive sampling (NPS, explained in the publication Sederberg, S. et al. "Attosecond optoelectronic field measurement in solids," Nat. Commun. 11, 430, (2020)), which exhibits a broad spectral response due to strong temporal gating provided by the highly nonlinear injection of carriers, with a hyperbolic roll-off vs. frequency, due to the fact that the technique records the vector potential of the test waveform.

The measured GHOST was selected through the combination of the orientation of the nonlinear optical element 12 (quartz crystal), the polarizer 14, and the spectral filter 16, as exemplarily shown in FIG. 1A.

Figure 2A:
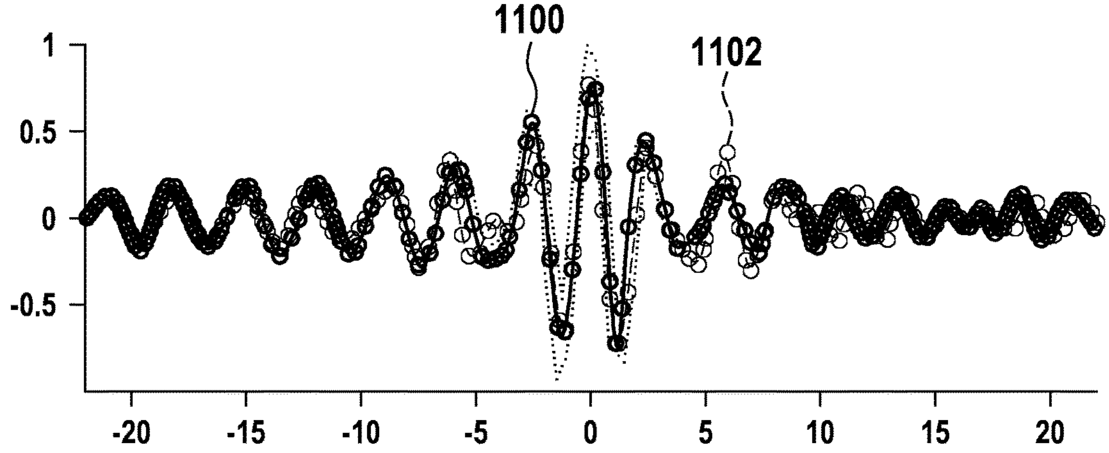
FIGS. 2A and 2B show results of a benchmarking measurement.
Figure 2B:
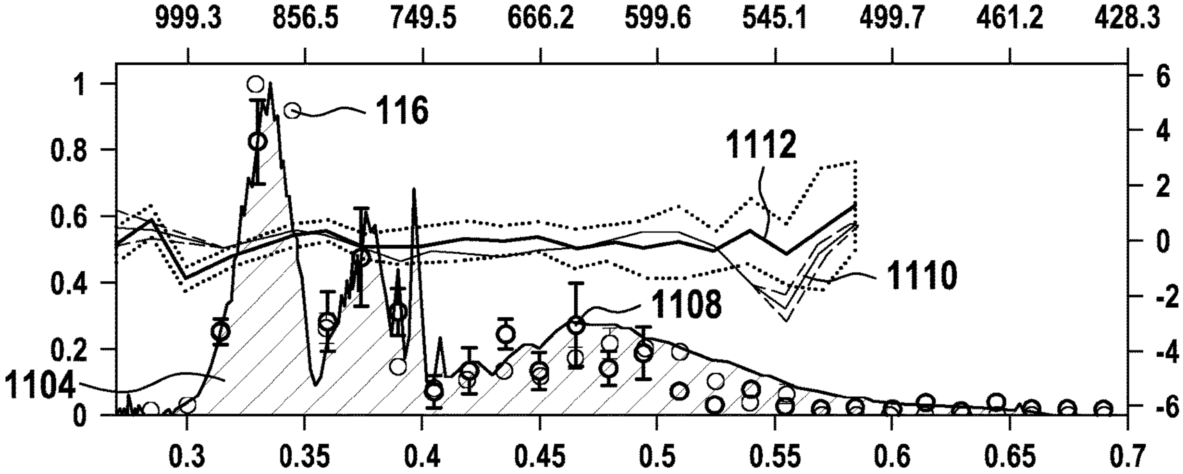

FIGS. 2A and 2B show a benchmarking measurement between the SFG+THG GHOST, NPS, and a calibrated grating spectrometer (Ocean Optics), using 2.7 fs sampling light pulses 22 (as explained in Sederberg, S. et al. "Attosecond optoelectronic field measurement in solids," Nat. Commun. 11, 430, (2020)). The test-waveform used for the high-frequency photonic sampling was obtained by third-harmonic generation of the very same test-waveform used for photonic sampling in the near-infrared and visible spectral range. By doing so, the test-waveform was up-converted to about 1250 THz. Corrections for the responses of the GHOST and NPS techniques were applied to the measured traces, as described further below. The fidelity of measured results confirms the validity of the SFG+THG GHOST. FIG. 2A depicts in a graph plotting the normalized electric field (vertical axis) over time (in femtoseconds) the temporal development of the electric field of the test-waveform 20 in the near infrared and visible spectral ranges measured with the SFG+THG GHOST (reference sign 1100) and with NPS (1102). As can be seen the obtained results are closely matching each other.

FIG. 2B depicts a comparison of the corresponding spectral intensities and phases obtained by Fourier transforming the measured test-waveforms with the spectrum obtained by a grating spectrometer. The lower horizontal axis indicates the frequency in PHz, the upper horizontal axis indicates the wavelength in nanometers, the left vertical axis indicates the normalized intensity, and the right vertical axis indicates the phase in radians. The plotted graphs represent the spectrum 1104 measured by the grating spectrometer, intensity 1106 measured by SFG/DFG+THG GHOST, the intensity 1108 measured by NPS, the phase 1110 measured by SFG/DFG+THG GHOST, and the phase 1112 measured by NPS. As can be seen, the deviation of the measurement carried out with SFG/DFG+THG GHOST and the control measurement carried out with NPS are minor and well within the error of the respective measurement techniques. Thus, the control measurement confirms the validity of the results obtained with the SFG/DFG+THG GHOST measurements.

Figure 3A:
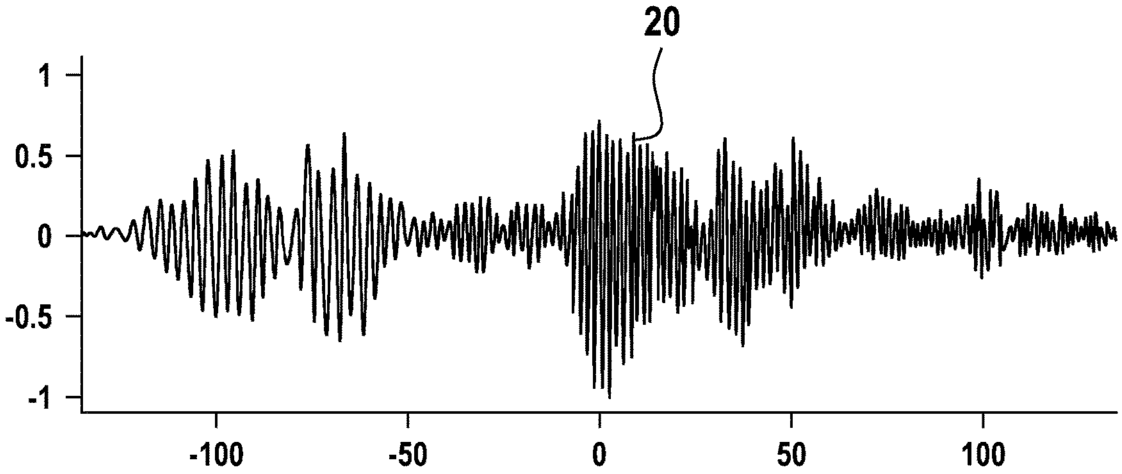
With reference to FIGS. 3A and 3B the retrieval of the upconverted test-waveform 20 is presented and compared.
Figure 3B:
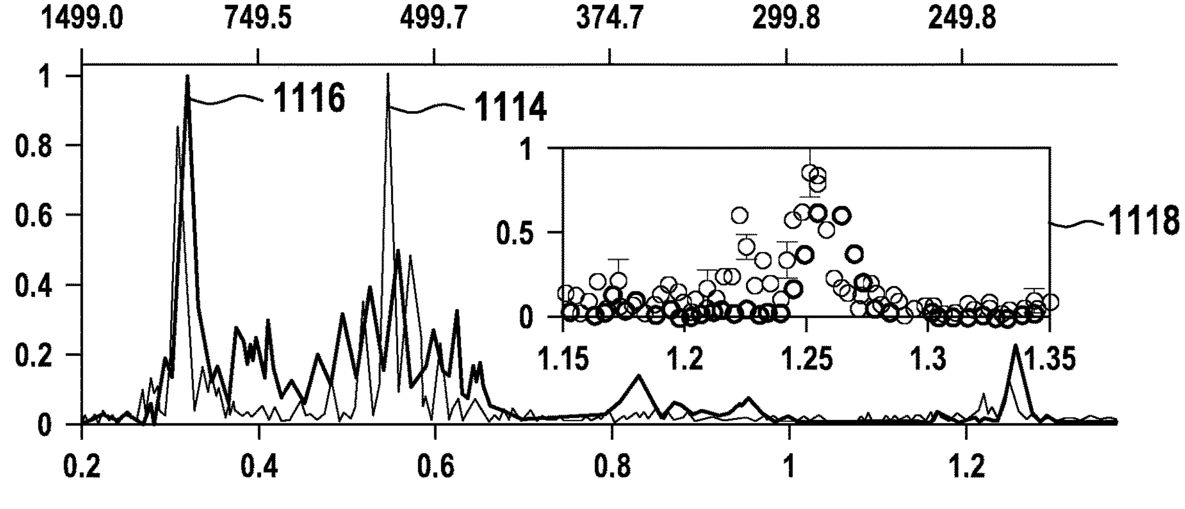

With reference to FIGS. 3A and 3B the retrieval of the upconverted test-waveform 20 is presented and compared. The upconverted test-waveform was frequency tripled in a BBO crystal. For measuring the higher frequency test-waveform, a different GHOST channel is used, which is better suited for the higher frequencies. According to the used GHOST channel the signal wave is generated by difference frequency generation (DFG) of the test-waveform and the sampling light pulse, while the LO is provided by third harmonic generation of the sampling light pulse resulting in a suitable spectral overlap between signal wave and LO. FIG. 3A presents the detected test-waveform 20 in the time domain detected by DFG+THG GHOST. The vertical axis represents the normalized signal and the horizontal axis the time in femtoseconds. As can be seen, the detected test-waveform 20 contains a rapid ultraviolet oscillation preceded by remaining lower-frequency components of the original test-waveform. FIG. 3B depicts spectral intensity 1114 of the test-waveform obtained via Fourier transformation from the GHOST detected electric field of the test-waveform 20 in the time domain and a comparison with the spectrum 1116 measured by a grating spectrometer. The lower horizontal axis represents the frequency in Petahertz, the upper horizontal axis the wavelength in nanometers, and the vertical axis the normalized intensity. The shaded area shows a confidence interval of one standard deviation. An enlarged and normalized view of the high-frequency range from 1.15 PHz to 1.35 PHz is presented in the inlay. The comparison of the SFG/DFG+THG GHOST measurement and the spectral intensity obtained with a grating spectrometer are in agreement, which confirms that this specific implementation of GHOST offers a PHz detection cut-off, far exceeding that of EOS using the same sampling wave. The scaling of the measured signal as a function of intensity serves both as a confirmation of the combination of nonlinear effects it contains and indicates how laser intensity fluctuations will translate into measurement noise.

Figure 4A:
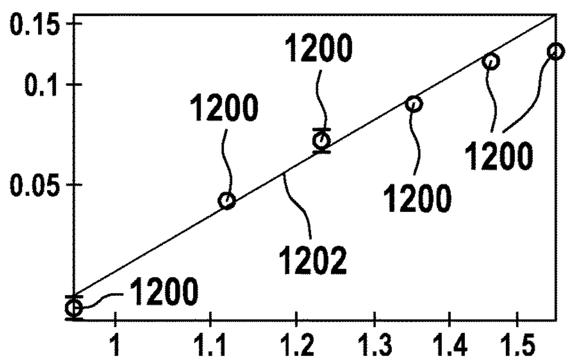
FIGS. 4A to 4C show the scaling of the measured interference signal with the electric field strength of the incident sampling light pulse and the field strength of the test-waveform.
Figure 4B:
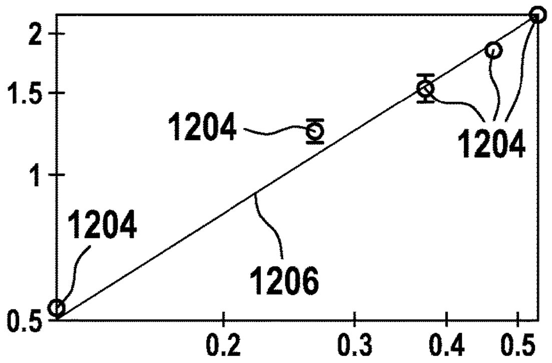
Figure 4C:
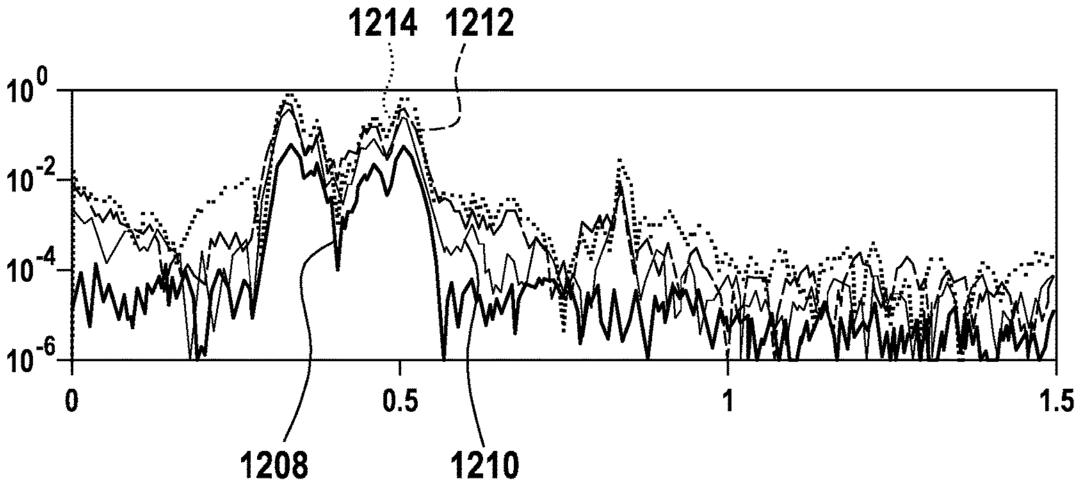

FIGS. 4A to 4C show the scaling of the measured interference signal with the electric field strength of the incident sampling light pulse and the field strength of the test-waveform. FIG. 4A indicates at the horizontal axis the field strength of the sampling light pulse in V/Å and the vertical axis indicates the amplitude of the interference signal integrated over several measurements in arbitrary units. The point values 1200 represent the experimental data and the straight line 1202 represents an $E^4$ fit plotted for comparison.

FIG. 4B indicates at the horizontal axis the field strength of the test-waveform in V/Å and the vertical axis indicates the amplitude of the interference signal integrated over several measurements in arbitrary units. The point values 1204 represent the experimental data and the straight line 1206 represents a linear fit for comparison.

The experimental results presented in FIGS. 4A and 4B agree with the expected scaling based on SFG+THG GHOST, which should depend on the fourth power of the field strength of the sampling light pulse (the square of its intensity) and be linearly proportional to the strength of the field of the test-waveform being measured.

FIG. 4C shows a typical logarithmically-scaled measured spectrum and spectral noise floor, wherein the horizontal axis indicates the frequency in PHz and the vertical axis indicates the normalized intensity. The graphs represent measurements at different field strengths of the test-waveform. wherein graph 1208 represents 0.12 V/Å, graph 1210 represents 0.27 V/Å, graph 1212 represents 0.38 V/Å, and 1214 represents 0.46 V/Å. FIG. 4C demonstrates a typical signal-to-noise ratio (SNR) of the detection through the offset of the baseline, indicating an intensity SNR of approximately 30 dB under these measurement conditions. The SNR is independent of the strength of the field strength of the test-waveform in this case because the noise of the measurement is dominated by laser intensity fluctuations.

In conclusion, waveform sampling using a flexible combination of nonlinear optical processes for the generation of a broadband signal and local oscillator allows oscillating electric fields up to PHz frequencies to be recorded with high fidelity.

The spectral response can be tailored for a particular application through the choice of nonlinear processes and the spectral bandwidth used for the measurement. Any medium that exhibits the required nonlinearities, such as solids or gases, could be used for waveform sampling. These techniques present new opportunities for highly sensitive time-resolved spectroscopy and for the extension of field-resolved attosecond science to new wavelength ranges. A high tolerance regarding the ambient conditions and the simplicity of techniques make them accessible via a broad variety of laser systems.

Figure 5:
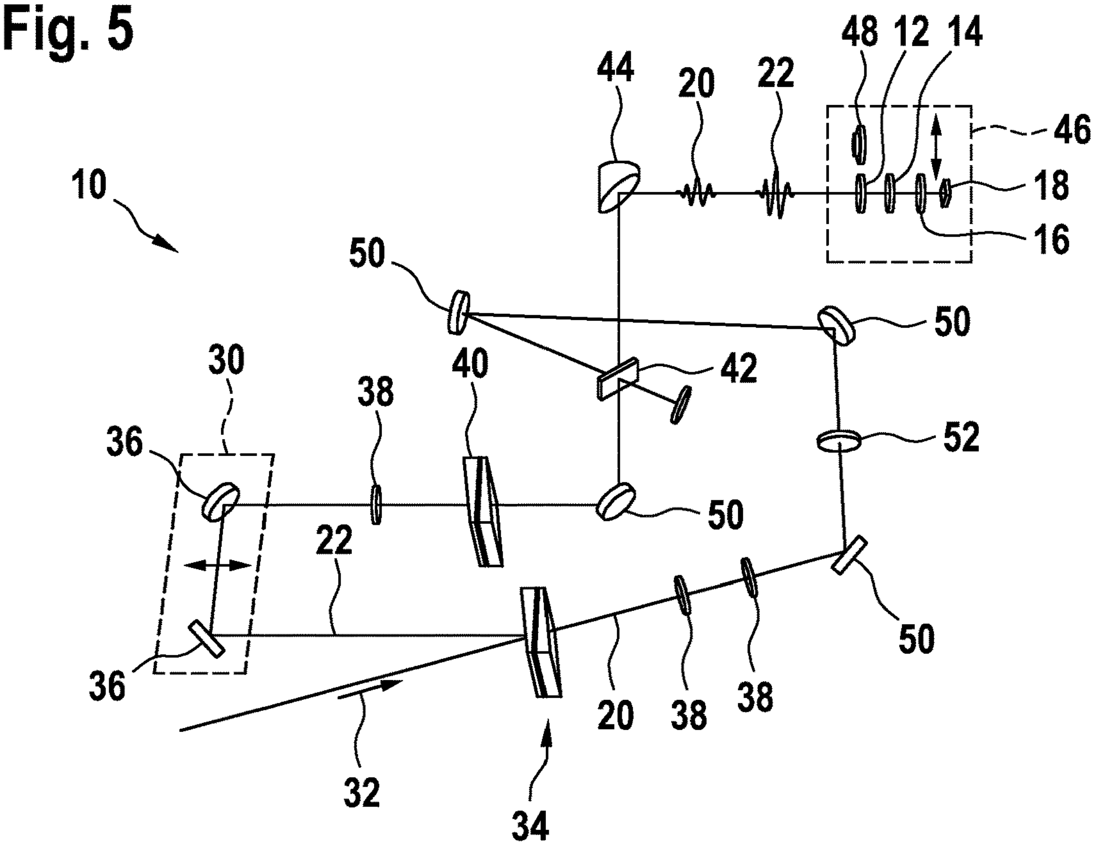
FIG. 5 schematically depicts a device for photonic sampling of a test-waveform according to an exemplary embodiment.

FIG. 5 schematically depicts a device 10 for photonic sampling of a test-waveform according to an exemplary embodiment. The device 10 comprises a nonlinear optical element 12, a polarizer 14, a spectral filter 16 and a heterodyne detector 18. Moreover, the device 10 comprises a delay stage 30 for varying a time delay t between the test-waveform 20 and the sampling light pulse 22.

An input laser beam 32 is split into two arms by taking a reflection from the front surface of a first wedge in a wedge pair 34. The reflected beam (sampling arm) is guided through the delay stage 30 comprising a retro-reflector 36, which comprises protected silver mirrors mounted on a closed-loop piezo stage (PX 200, Piezosystems Jena). Wire-grid polarizers 38 are used to attenuate the test-waveform 20 and sampling light pulses 22, while a fused-silica wedge pair 40 allows to compress and fine-tune the CEPs of the test-waveform 20 and the sampling light pulses 22. Both arms were then recombined by a wire-grid polarizer 42, which is set to transmit the pulses in the test arm and reflect the pulses in the sampling arm. The test-waveform 20 and sampling light pulses 22 being orthogonally polarized are then focused by a protected silver off-axis parabolic mirror 44 for the detector setup 46. The detector setup 46 comprises the above-mentioned components allowing a photonic sampling of the test waveform according to the GHOST technique. The detector setup 46 further comprises a NPS detector 48, which allows an alternative NPS measurement. The NPS measurement may be carried out for cross-checking the GHOST measurement or vice versa. Hence, the device 10 may be used to evaluate the GHOST measurements.

The nonlinear optical element consists of a quartz crystal (~12 μm thick, z-cut) is used to generate a local oscillator 24 by frequency multiplication of the sampling light pulse 22 and a signal wave 26 by wave-mixing of the sampling light pulse 22 and the test-waveform 20, which are then filtered by a spectral bandpass filter 16 and the polarizer 14 being a wire-grid polarizer. The light is then detected by a heterodyne detector 18 comprising a photodiode 28. The beam block 54 is used to block the residual light after the polarizer 42. Several plane protected silver mirrors 50 are used for beam guiding. A reflective UVFS neutral-density filter 52 was used for field attenuation in the test arm.

Figure 6:
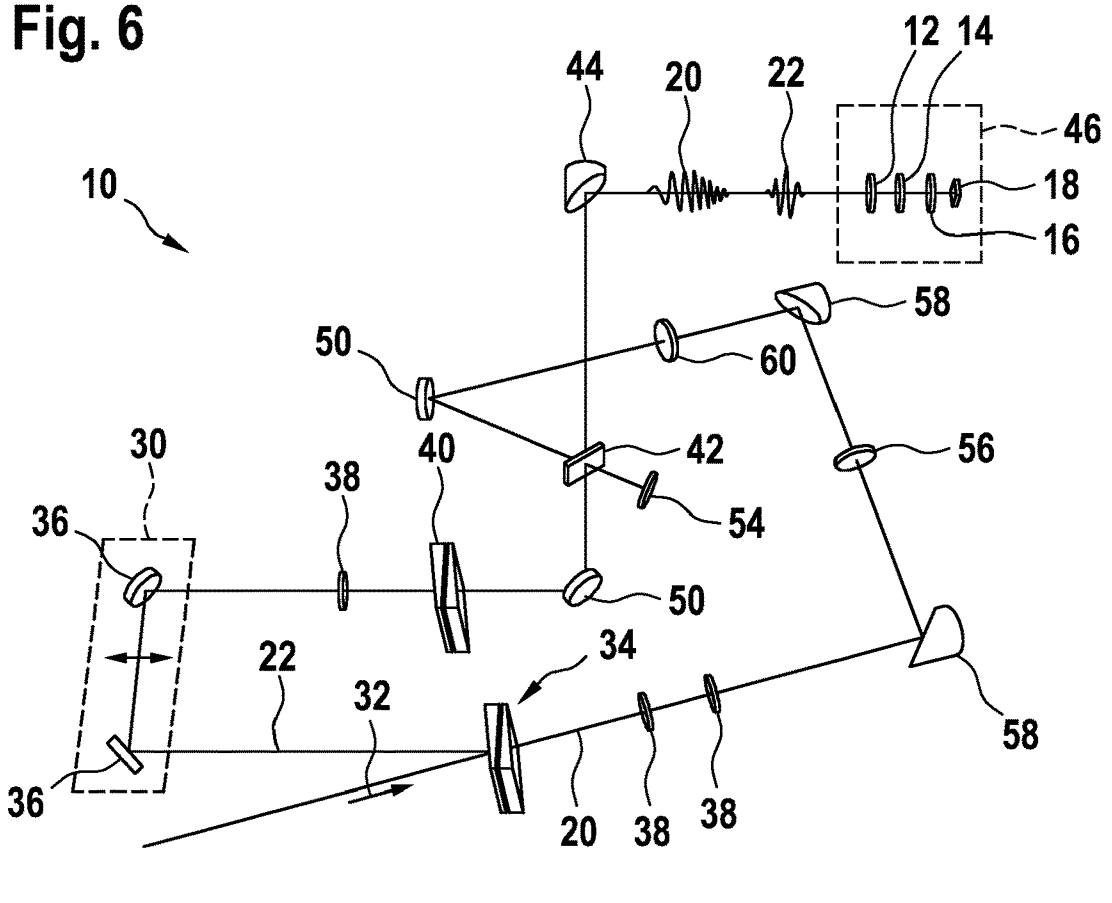
FIG. 6 schematically depicts a further device for photonic sampling of a test-waveform using a broadband GHOST detection technique according to an exemplary embodiment.

FIG. 6 schematically depicts a further device 10 for photonic sampling of a test-waveform 20 using a broadband GHOST detection technique according to an exemplary embodiment. The device 10 illustrated in FIG. 6 corresponds in most aspects to the device presented in FIG. 5. The detailed description of the corresponding components and features presented with reference to FIG. 5 shall be valid also for the exemplary embodiment shown in FIG. 6. The exemplary embodiment of FIG. 6 differs from the exemplary embodiment of FIG. 5 in an additional nonlinear optical element 56 provided in the arm of the test-waveform 20 and two off-axis parabolic mirrors 58 for focusing the test-waveform 20 onto the further nonlinear optical element 56 and re-collimating the beam. The further nonlinear optical element 56 is a type II BBO crystal having a thickness of 100 μm, which is used to generate new spectral components by frequency multiplication of the test-waveform down to a wavelength of 235 nm. These newly generated spectral components may serve as test-waveform having high-frequencies to demonstrate the capabilities of the GHOST techniques. However, according to other exemplary embodiments, an experimental stage may be provided in the test-waveform arm allowing a light-matter interaction with the test-waveform, which may then be investigated by the photonic sampling of the test-waveform in the detector setup 46. Both arms are then recombined in the wire-grid polarizer 42 and focused with the protected aluminum off-axis parabolic mirror 44 to the GHOST detection setup 46. The wire-grid polarizer 60 ensured the linear polarization of the test arm after interaction with the further nonlinear optical element 56.

The following disclosure provides further background information and a theoretical description of some aspects of the photonic sampling methods according to some exemplary embodiments described herein. However, the presented exemplary embodiments are not limited to the following description.

Maxwell-Equation Model With Propagation Effects

Propagation effects, such as dispersion, absorption, phase mismatch, etc., may influence the spectral response of the GHOST detection. We modeled these effects by numerically solving Maxwell's equations on a one-dimensional grid. Since the dispersion of the refractive index is a deciding factor in the coherent build-up of the signals of interest, it is advantageous to keep it as accurate as possible, including all dispersion orders. This may be somewhat atypical for a time-domain calculation, and naive application of the refractive index from a Sellmeier equation found in the literature may lead to non-physical results, as they are typically the summation of a number of Lorentzian resonances, matched only to the real part of the refractive index. However, in the time domain, the refractive index of the material is contained in a response function, which must obey causality. Single Lorentzian resonances, although their resulting polarizations can be calculated quite efficiently in the time domain, typically lead to large inaccuracies in the absorption beneath the band-gap of typical solids. In our model, an appropriate time-domain response function is found by first placing a series of absorption bands in the frequency domain and then calculating the resulting refractive index through the Kramers-Krönig relations, which ensures that the resulting function will obey causality. The refractive index is matched to literature values in a nonlinear least-squares fitting. There is some freedom in choosing the length of the response function, but typically it contains 3.000-15.000 points, with a time step of 6 attoseconds (0.25 atomic units). This means that the history of the electric field must be stored at each point on the grid which contains the crystal. In other words, previous values of the electric fields must be stored in order to calculate the new ones. Additionally, the histories of the linear and nonlinear polarizations are stored at each point.

The linear polarization is calculated as a convolution of the field history with the response function, meaning its value at time t is given by $$P^{(1)}(t) = \int_{-t_L}^{t} dt' \chi^{(1)}(t) E(t - t'), \tag{1}$$

where $t_L$ is the (finite) length of the response function $\chi^{(1)}(t)$.

The nonlinear polarizations can be calculated from the convolution of the field with a separate set of response functions, which can differ for different orientations of each instance of the field.

For the second-order polarization:

$$P_k^{(2)}(t) = \int_{-t_L}^{t} dt' \chi_{jk}^{(2)}(t) E_j(t - t') \int_{-t_L}^{t'} dt'' \chi_{ij}^{(2)}(t) E_i(t - t'') \tag{2}$$

For the third-order polarization:

$$P_1^{(3)}(t) = \int_{-t_L}^{t} dt' \chi_{k1}^{(3)}(t) E_k(t - t') \int_{-t_L}^{t'} dt'' \chi_{jk}^{(3)}(t) E_j(t - t') \int_{-t_L}^{t''} dt''' \chi_{ij}^{(3)}(t) E_i(t - t''') \tag{3}$$

The subscripts of the fields and polarizations indicate the direction of the field within the material and, in general, must be summed over all combinations. As a significant simplification, we employ the same response function, derived from the linear response, for the nonlinear terms, with a weighting determined by the susceptibility tensors of the crystal, thus approximating the dispersion of the nonlinear coefficients by Miller's rule. The values of the polarization in the given directions come from summing over the elements of the nonlinear tensors, which are then normalized by the known linear susceptibility $\chi^{(1)}$ at a frequency of interest $\omega_0$. The normalization factor, $\chi^{(1)}$, can be extracted from a measured or calculated refractive index by means of Eq. (4).

$$n(\omega_0) = \sqrt{\{1 + \chi^{\{(1)\}(\omega_0)}\}}. \tag{4}$$

The full polarization is calculated using the full tensor nature of the third and second-order nonlinearities, meaning that 14 separate polarizations are calculated for the two polarization components at each time step and contribute to the final polarization, which serves as a driving term in Maxwell's equations. The calculation of the nonlinear polarization is by far the most numerically intensive step in the propagation. The full propagation is performed using numerically evaluated spatial derivatives that are accurate to sixth order in the spatial grid step. Convergence checks were performed such that the dispersion and transmission of broadband pulses up to 1 PHz frequency are transmitted with numerical dispersion accounting for <0.001 of the actual dispersion.

Spectral Response of the Photodiode and Bandpass Filter

Figure 7:
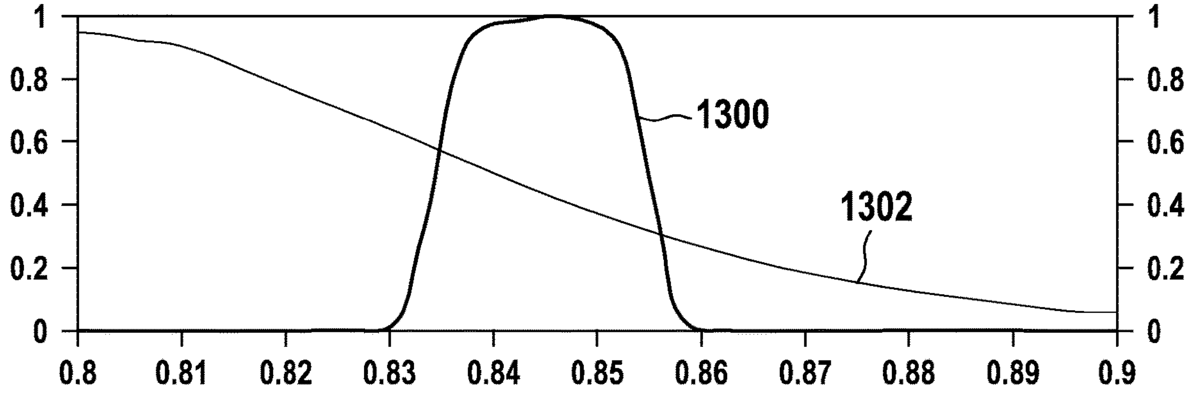
FIG. 7 shows the spectral sensitivity of a used photodiode.

To get a more accurate experimental spectral response of detection, as well as to perform simulations close to experimental conditions, we took into account the spectral sensitivity of the photodiode 28 (ALPHALAS GmbH) and the transmission of the spectral bandpass filter 16 (Thorlabs), as plotted in FIG. 7. The horizontal axis indicates the frequency in PHz and the vertical axis the normalized transmission. Graph 1300 represents the filter transmission and graph 1302 the spectral response of the photo diode.

Influence of Propagation Effects and Spectral Response Formation

When sampling light pulses and test-waveforms having linear polarizations being orthogonal to each other, polarizations of the produced local oscillator and the signal wave will depend on a symmetry of the nonlinear optical element. For instance, z-cut α-quartz crystal has both $\chi^{(2)}$ and $\chi^{(3)}$ non-linearities. Although the $\chi^{(3)}$ non-linearity is essentially crystal rotation independent, the $\chi^{(2)}$ nonlinear susceptibility tensor allows one to not only control a magnitude of a generated second-order process but also its polarization. This can be done by a simple rotation of a crystal. A z-cut α-quartz crystal can be positioned such that the polarization of the second harmonic of the sampling light pulse, will be orthogonal to the polarization of a sampling light pulse. On the other hand, a polarization of a wave-mixing-product generated by four wave mixing (FWM) between orthogonal sampling light pulse and test-waveform will be orthogonal to the sampling light pulse. The produced SFG and DFG between sampling and test pulses, at this orientation of the z-cut α-quartz crystal will, however, be collinear with the sampling light pulse. Therefore, placing a polarizer after a nonlinear medium allows one to choose between FWM/XPM+SHG and SHG/DFG+THG GHOST channels. If a polarizer is collinear with a sampling light pulse polarization, the SHG/DFG+THG channel is chosen. If a polarized is collinear with a test pulse, the FWM/XPM+SHG channel is chosen.

Figure 8:
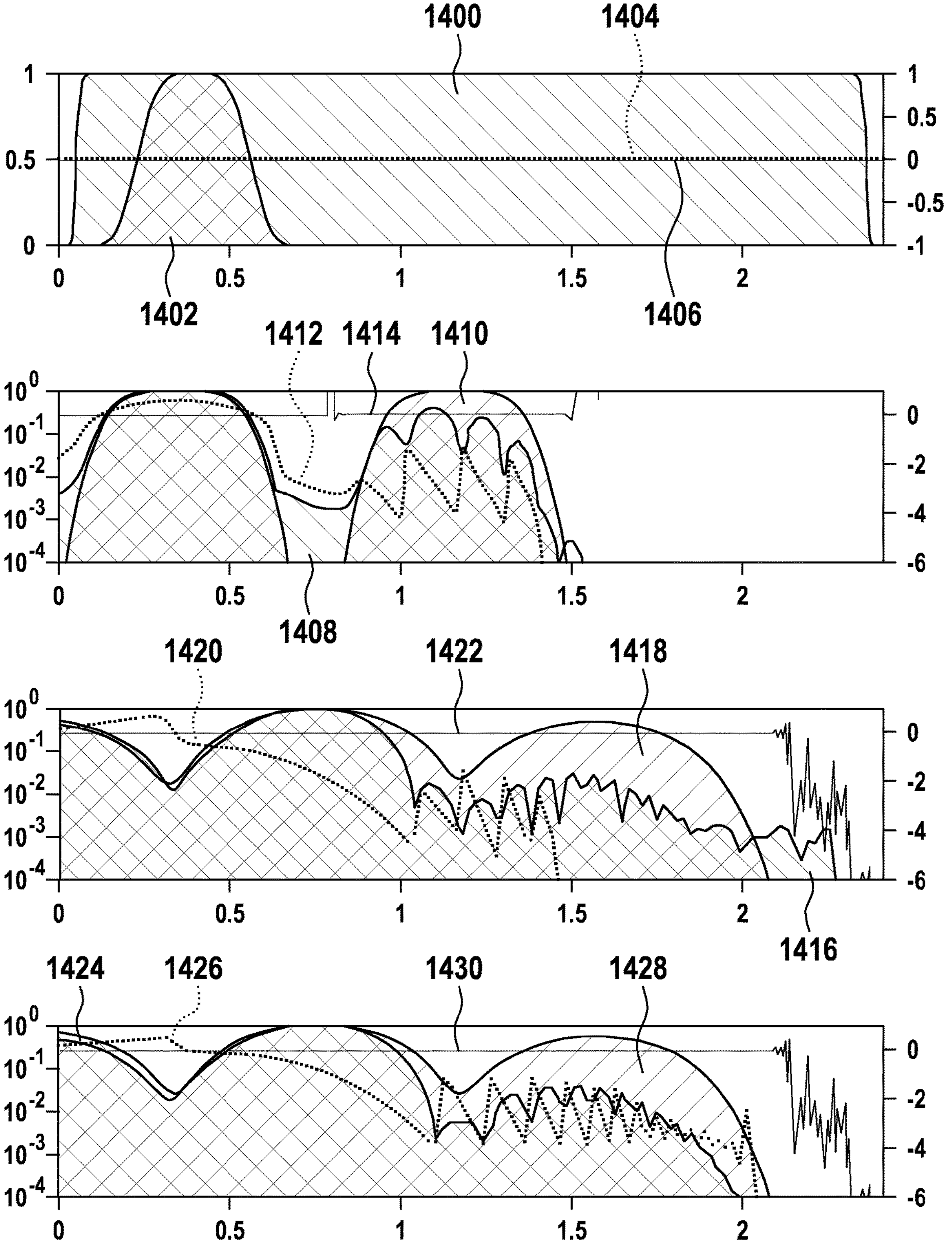
FIG. 8 shows a typical spectral response simulated with and without propagation though a 10 μm thick z-cut α-quartz crystal as a nonlinear optical element and 10 μm thick fused silica glass.

FIG. 8 shows a typical spectral response simulated with and without propagation though a 10 μm thick z-cut α-quartz crystal as a nonlinear optical element and 10 μm thick fused silica glass. The simulation is based on solving Maxwell's equations as described section above. The response without propagation, obtained under the assumption of an instantaneous nonlinear polarization response, is shown for comparison. The diagram in all sections a to d of FIG. 8 indicate the frequency in PHz at the horizontal axis, the normalized amplitude/amplitude response on the left vertical axis and the phase/phase difference in radians on the right vertical axis. Section a provides a Fourier representation of orthogonally polarized sampling light pulses and test pulses used for simulations, wherein graph 1400 represents the spectrum of the test-waveform, 1402 represents the spectrum of the sampling light pulse, 1404 the phase of the test-waveform and 1406 the phase of the sampling light pulse. Sections b and c are simulated spectral responses of a 10 μm thick z-cut α-quartz crystal as a nonlinear optical element oriented such that a second harmonic from the sampling light pulse is orthogonal to the polarization of the fundamental sampling light pulse. Section b corresponds to a detection along the polarization of a sampling light pulse, wherein 1408 and 1412 represent the amplitude response and phase with propagation, respectively, and 1410 and 1414 the represent the amplitude response and phase without propagation, respectively. Section c corresponds to the detection along the polarization of the test wave-form, wherein 1416 and 1420 represent the amplitude response and phase with propagation, respectively, and 1418 and 1422 the represent the amplitude response and phase without propagation, respectively. Section d shows a simulated spectral response of 10 μm thick fused silica medium, followed by a polarizer at 45° with respect to sampling light pulse and test-waveform polarizations. In FIG. 8, filled areas depict normalized spectral amplitude responses, while solid lines depict spectral phase differences. The detection frequency was set to 0.8 PHz (center of a second harmonic of the sampling light pulse).

Spectral Responses for NPS and GHOST Measurements

In order to confirm the detection of a test pulse waveform based on SFG+THG GHOST, the same test pulse waveform was measured with GHOST and NPS techniques. To reconstruct the electric field of the test pulse, the spectral responses of NPS and GHOST techniques were determined. For this purpose, the sampling light pulse was characterized with a calibrated grating spectrometer and with a PG FROG technique. From the characterized sampling light pulse, the spectral response of the NPS technique can be easily obtained as described in the publication Sederberg, S. et al. "Attosecond optoelectronic field measurement in solids," Nat. Commun. 11, 430 (2020). To obtain the GHOST spectral response, the propagation of a characterized sampling light pulse together with a known broadband theoretical pulse was simulated.

Figure 9:
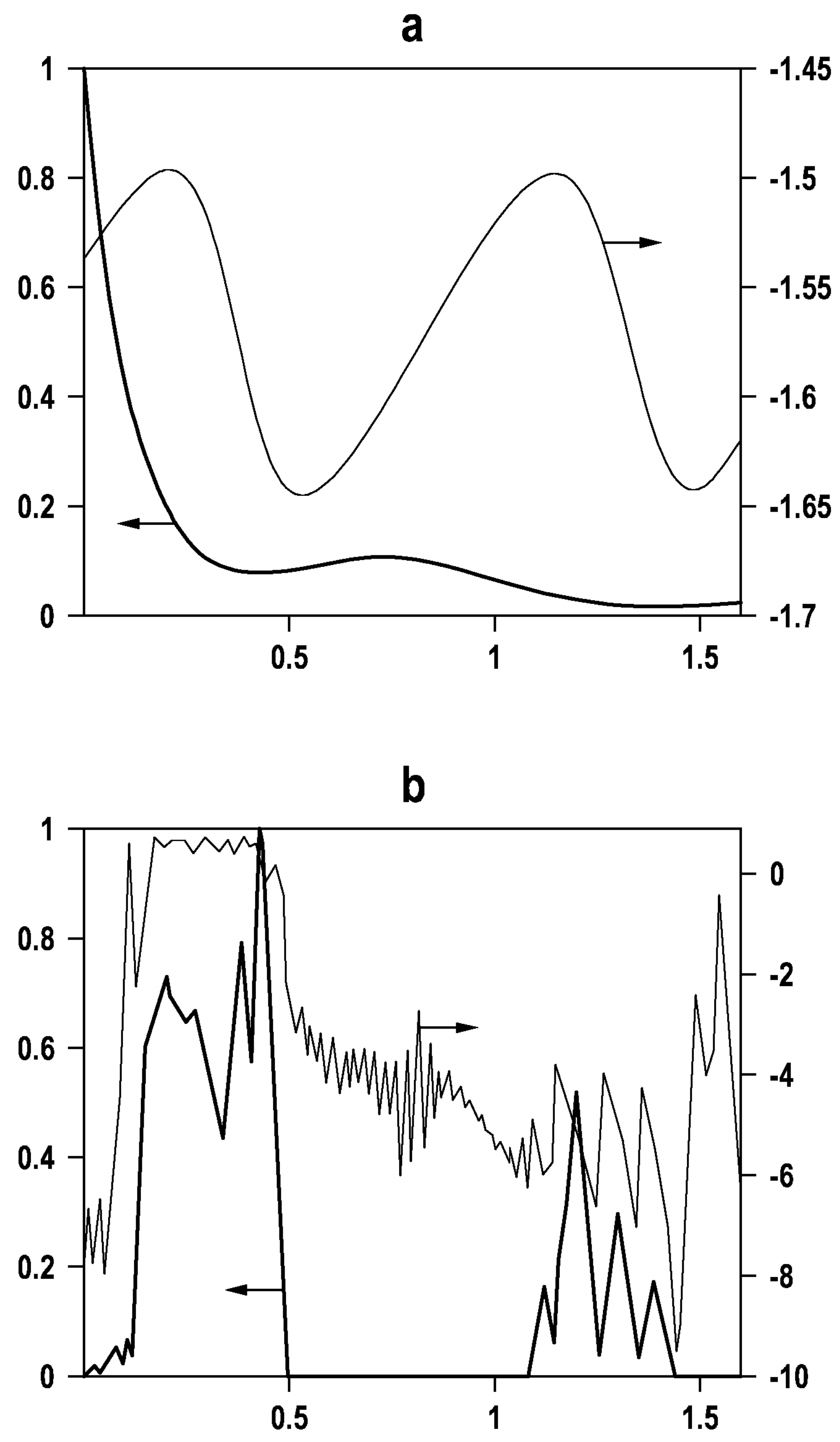
FIG. 9 shows the obtained experimental responses of both techniques for experimental sampling light pulse with CEP 0.

FIG. 9 shows the obtained experimental responses of both techniques for experimental sampling light pulse with CEP 0. In the experiment described above in the main text, the CEP of the sampling light pulse was set to 0 with a solid-state light-phase detection technique (see Paasch-Colberg, T. et al. "Solid-state light-phase detector," Nat. Photonics 8, 214-218 (2014)). FIG. 9 shows the calculated spectral responses of NPS (section a) and GHOST (SFG+THG and DFG+THG GHOST) (section b) techniques, based on the measured sampling light pulse. The horizontal axis indicates the frequency in PHz, the left vertical axis the normalized amplitude response and the right vertical axis the phase difference in radians.

Phase Dependence of Waveform Detection

The appearance of a stable waveform when measuring unstable electric fields can be understood through a detailed look at the measurement process. It emerges that the CEP of the test waveform, and the fluctuations it contains, is canceled in the measurement through an equal and opposite contribution of the CEP of the sampling light pulse. The quantity that remains is a stable waveform containing similar information to what one would obtain from a traditional pulse measurement technique but measured in a way that allows sensitivity enhancement methods from field sampling and without further post-processing with an iterative algorithm.

The relationship between the measured signal in the case of the SFG+SHG GHOST and the actual electric field can be described as follows. The SHG and SFG fields, $\tilde{E}_{SHG}$ and $\tilde{E}_{SFG}$, are either derived from the square of the sampling light pulse, or the product of the sampling light pulse with the test field. In the frequency domain, these products become the convolution between the spectra:

$$\widetilde{E_{SHG}}(\omega, \phi_S) = \widetilde{C_{SHG}}(\omega)\int_{-\infty}^{\infty} d\omega'\widetilde{E_S}(\omega)e^{i\phi_S}\widetilde{E_S}(\omega-\omega')e^{i\phi_S} = e^{2i\phi_s}\widetilde{E_{SHG}}(\omega, 0), \tag{5}$$

$$\widetilde{E_{SFG}}(\omega, \phi_S, \phi_T) = \widetilde{C_{SFG}}(\omega) = \int_{-\infty}^{\infty} d\omega'\widetilde{E_T}(\omega)e^{i\phi_T}\widetilde{E_S}(\omega-\omega')e^{i\phi_S} = e^{i(\phi_S-\phi_T)}\widetilde{E_{SFG}}(\omega, 0, 0), \tag{6}$$

where the CEPs of the sampling light pulse and test-waveform, $\phi_S$ and $\phi_T$, have been written explicitly, and the complex-valued constants $\widetilde{C_{SHG}}(\omega)$ and $\widetilde{C_{SFG}}(\omega)$ are determined by the nonlinear coefficients and phase-matching properties of the nonlinear medium, as well as their subsequent filtration and focusing onto the detector.

Their combined intensity on the detector is $$I_d(\omega, \phi_S, \phi_T) \propto |\widetilde{E_{SHG}}(\omega, \phi_S) + \widetilde{E_{SFG}}(\omega, \phi_S, \phi_T)|^2 = |\widetilde{E_{SHG}}(\omega, \phi_S)|^2 + |\widetilde{E_{SFG}}(\omega, \phi_S, \phi_T)|^2 + |\widetilde{E_{SHG}}(\omega, \phi_S)\widetilde{E_{SHG}}(\omega, \phi_S)| \cos[\phi_T - \phi_S + \Phi_{SFG}(\omega) - \Phi_{SHG}(\omega)],$$

where $\Phi_{SFG}(\omega)$ and $\Phi_{SFG}(\omega)$ are the spectral phases of $\widetilde{E_{SHG}}(\omega, 0)$ and $\widetilde{E_{SFG}}(\omega, 0,0)$, respectively. The first two terms on the right-hand side are independent of $\phi_S$ and $\phi_T$, and only the final term, the cross term involving both fields, is relevant for field sampling.

In a typical measurement, one would introduce a time delay $\tau$ to one of the fields, introducing a linear phase $\omega\tau$ in the frequency domain. The resulting modulation of the cross-term on the RHS of Eq. (7) then would trace out the measured waveform as the time delay $\tau$ was varied.

Now, we can see where the CEPs of the input fields enter the measurement. As mentioned previously, the SFG+SHG GHOST experiences a CEP shift of $-\phi_S$, due to the appearance of this phase in Eq. (7), unlike in, e.g., EOS, where all $\phi_S$ contributions cancel. Accordingly, it is beneficial to determine and stabilize $\phi_S$ in order to determine the waveform of the test field.

We also note that in the case where $\phi_T$ is fixed (for example, if the field of the test-waveform was derived from difference frequency generation), introducing a linear time dependence to $\phi_S$ results in a sinusoidal variation of the cross term in Eq. (7). The time-averaged current will be zero, but a detectable high-frequency electronic signal will be introduced. Thus, by introducing an offset of the frequency comb of the sampling light pulse, an arbitrarily fast (up to the Nyquist frequency) modulation of this signal can be introduced, enabling sensitive detection when applied to MHz-repetition-rate laser systems with a controlled carrier-envelope offset frequency.

LIST OF REFERENCE SIGNS

10 device for photonic sampling of a test-waveform
12 nonlinear optical element
14 polarizer
16 spectral filter
18 heterodyne detector
20 test-waveform
22 sampling light pulse
24 (wave-mixing product used as) local oscillator
26 (wave-mixing product used as) signal wave
28 photodiode
30 delay stage
32 input laser beam
34 wedge pair
36 retro-reflector
38 polarizer
40 wedge pair
42 polarizer
44 off-axis parabolic mirror
46 detector setup
48 NPS detector
50 silver mirror
52 neutral-density filter
54 beam block
56 further nonlinear optical element
58 off-axis parabolic mirror
60 polarizer
1000, 2000 three-dimensional graph
1002, 2002 frequency-axis
1004, 2004 time delay axis
1006, 2006 normalized intensity axis
1008, 2008 inlay presenting temporal development
1010, 2010 signal obtained with EOS
1012, 2012 signal obtained with GHOST
1100-1430 various graphs

The invention claimed is:

1. A method for photonic sampling of a test-waveform, the method comprising:
providing a sampling light pulse;
generating a local oscillator by frequency multiplication of the sampling light pulse;
generating a signal wave by frequency mixing of the sampling light pulse and the test-waveform in a solid nonlinear optical element, wherein the frequency multiplication of the sampling light pulse and the frequency mixing of the sampling light pulse and the test-waveform are selected such that the local oscillator and the signal wave are at least partly spectrally overlapping, and wherein the frequency multiplication of the sampling light pulse is carried out in the same solid nonlinear optical element as the frequency mixing of the sampling light pulse and the test-waveform;
detecting an interference signal of the local oscillator and the signal wave for various time delays of the sampling light pulse with respect to the test-waveform; and
determining a temporal evolution of at least one of an electric field of the test waveform and the envelope function of the test-waveform based on the detected interference signal.

2. The method according to claim 1, wherein one or more of the following harmonics of the sampling light pulse are provided by the frequency multiplication as the local oscillator: second harmonic, third harmonic, and fourth harmonic.

3. The method according to claim 1, wherein the signal wave is provided by at least one of the following frequency mixing processes: sum frequency generation, difference frequency generation, four wave mixing involving the sum of two photons of the sampling light pulse and one photon of the test-waveform, four wave mixing involving the difference of two photons of the sampling light pulse and one photon of the test-waveform; cross phase modulation.

4. The method according to claim 1, wherein the solid nonlinear optical element has a thickness of 100 μm or less.

5. The method according to claim 1 wherein the solid nonlinear optical element has a thickness of more than 100 μm and is provided at an angle satisfying a phase matching condition for the test-waveform and the sampling light pulse.

6. The method according to claim 1, wherein the test-waveform is spectrally centered in the near-infrared or the visible spectral range and/or wherein the sampling light pulse is spectrally centered in the near-infrared or the visible spectral range.

7. The method according to claim 1, wherein the local oscillator and/or the signal wave are spectrally centered in the visible or ultraviolet spectral range.

8. The method according to claim 1, further comprising:
spectrally filtering and/or polarization filtering at least the spectrally overlapping components of the local oscillator and the signal wave prior to heterodyne detection.

9. The method according to claim 1, wherein test-waveform and the sampling light pulse are based on carrier-envelope phase (CEP) stabilized laser pulses.

10. The method according to claim 1, wherein only one photon of the test-waveform is involved in generating a photon of the signal wave.

11. A method for photonic sampling of a test-waveform, the method comprising:
providing a sampling light pulse;
generating a local oscillator by frequency multiplication of the sampling light pulse;
generating a signal wave by frequency mixing of the sampling light pulse and the test-waveform in a solid nonlinear optical element, wherein the frequency multiplication of the sampling light pulse and the frequency mixing of the sampling light pulse and the test-waveform are selected such that the local oscillator and the signal wave are at least partly spectrally overlapping, wherein the nonlinear order of the wave-mixing process involved in generating the local oscillator is identical to the nonlinear order of the wave-mixing process involved in generating the signal wave;
detecting an interference signal of the local oscillator and the signal wave for various time delays of the sampling light pulse with respect to the test-waveform; and determining a temporal evolution of at least one of an electric field of the test waveform and the envelope function of the test-waveform based on the detected interference signal.

12. A device for photonic sampling of a test-waveform, the device comprising:

a delay stage for varying a temporal delay of a sampling light pulse with respect to the test-waveform;

a solid nonlinear optical element for generating a local oscillator by frequency multiplication of the sampling light pulse and for generating a signal wave by frequency mixing photons of the test-waveform and the sampling light pulse such that the local oscillator and the signal wave are at least partly spectrally overlapping;

a heterodyne detector for detecting an interference signal of the spectrally overlapping local oscillator and the signal wave for various temporal delays of the sampling light pulse with respect to the test-waveform, wherein the device is adapted to determine a temporal evolution of at least one of an electric field of the test waveform and the envelope function of the test-waveform based on the detected interference signal.

13. The device according to claim 12, wherein the heterodyne detector comprises a photodetector for providing an electric signal based on the spectrally overlapping local oscillator and the signal wave interfering at the photodetector.

14. The device according to claim 12, further comprising:

a spectral filter for spectrally filtering the spectrally overlapping components of the local oscillator and the signal wave prior to heterodyne detection; and/or a polarization filter for polarization filtering at least a part of the spectrally overlapping local oscillator and the signal wave prior to heterodyne detection.

15. The method according to claim 1, wherein the solid nonlinear optical element has a thickness of 10 μm or less.

* * * * *